United States Patent
Wehrman et al.

(10) Patent No.: US 11,461,546 B2
(45) Date of Patent: *Oct. 4, 2022

(54) MEDIA CONTENT ITEM GENERATION FOR A CONTENT SHARING PLATFORM

(71) Applicant: Snap Inc., Santa Monica, CA (US)

(72) Inventors: Ian Anthony Wehrman, Venice, CA (US); Giles Goodwin, San Francisco, CA (US); Jared Iwata, Culver City, CA (US); Eugene Feingold, Santa Monica, CA (US); David LeMieux, Hermosa Beach, CA (US)

(73) Assignee: Snap Inc., Santa Monica, CA (US)

( * ) Notice: Subject to any disclaimer, the term of this patent is extended or adjusted under 35 U.S.C. 154(b) by 0 days.

This patent is subject to a terminal disclaimer.

(21) Appl. No.: 17/122,677

(22) Filed: Dec. 15, 2020

(65) Prior Publication Data

US 2021/0103697 A1    Apr. 8, 2021

Related U.S. Application Data

(63) Continuation of application No. 16/227,595, filed on Dec. 20, 2018, now Pat. No. 10,915,705.

(51) Int. Cl.
*G06F 40/186* (2020.01)
*G06F 3/0482* (2013.01)
(Continued)

(52) U.S. Cl.
CPC ......... *G06F 40/186* (2020.01); *G06F 3/0482* (2013.01); *G06F 40/205* (2020.01); *H04L 67/52* (2022.05); *H04L 67/01* (2022.05)

(58) Field of Classification Search
None
See application file for complete search history.

(56) References Cited

U.S. PATENT DOCUMENTS 6,539,420 B1    3/2003  Fields et al.
7,039,658 B2    5/2006  Starkey
(Continued)

OTHER PUBLICATIONS

"U.S. Appl. No. 16/227,616, Final Office Action dated Feb. 16, 2021", 27 pgs.

(Continued)

*Primary Examiner* — Maikhanh Nguyen
(74) *Attorney, Agent, or Firm* — Schwegman Lundberg & Woessner, P.A.

(57) ABSTRACT

Systems and methods are provided for receiving location information for source data associated with a publisher identifier and determining a set of selectors associated with the publisher identifier, each selector comprising specified content to extract from the source data and one or more rules for extracting the specified content. The systems and method further provided for extracting from the source data, specified content for each selector of at least a subset of the set of selectors based on the one or more rules specified in each selector of the at least subset of the set of selectors, determining a first template to use to generate the media content item, the first template comprising regions corresponding to one or more selectors, populating each region of the first template using specified content for the corresponding selector and generating the media content item from the populated first template.

20 Claims, 11 Drawing Sheets

(51) Int. Cl.
G06F 40/205 (2020.01)
H04L 67/52 (2022.01)
H04L 67/01 (2022.01)

(56) References Cited

U.S. PATENT DOCUMENTS

| | | | |
|---|---|---|---|
| 7,664,813 | B2 | 2/2010 | Pettit et al. |
| 8,751,916 | B2* | 6/2014 | Bender .................. G06F 16/48 |
| | | | 715/202 |
| 9,681,265 | B1 | 6/2017 | Davis et al. |
| 10,621,274 | B2* | 4/2020 | Weskamp ............. G06F 3/0488 |
| 10,915,705 | B1 | 2/2021 | Wehrman et al. |
| 2002/0059327 | A1 | 5/2002 | Starkey |
| 2003/0040926 | A1 | 2/2003 | Milton |
| 2006/0041685 | A1 | 2/2006 | Bracewell et al. |
| 2007/0038931 | A1 | 2/2007 | Allaire et al. |
| 2007/0100959 | A1 | 5/2007 | Eichstaedt et al. |
| 2007/0255811 | A1* | 11/2007 | Pettit .................. G06F 16/9577 |
| | | | 709/220 |
| 2009/0241015 | A1* | 9/2009 | Bender ................ G06F 40/103 |
| | | | 715/202 |
| 2010/0241498 | A1 | 9/2010 | Chung et al. |
| 2012/0284245 | A1 | 11/2012 | Portnoy et al. |
| 2013/0024757 | A1 | 1/2013 | Doll et al. |
| 2013/0144692 | A1 | 6/2013 | Shalabi et al. |
| 2013/0145257 | A1 | 6/2013 | Shalabi et al. |
| 2013/0185366 | A1 | 7/2013 | Joy |
| 2014/0006930 | A1 | 1/2014 | Hollis et al. |
| 2014/0281853 | A1 | 9/2014 | Bender et al. |
| 2014/0317201 | A1 | 10/2014 | Mcneil et al. |
| 2014/0325374 | A1 | 10/2014 | Dabrowski et al. |
| 2014/0331124 | A1 | 11/2014 | Downs et al. |
| 2014/0351268 | A1 | 11/2014 | Weskamp et al. |
| 2015/0026304 | A1* | 1/2015 | Mukherjee ............. H04L 67/02 |
| | | | 709/219 |
| 2015/0213561 | A1* | 7/2015 | Hollis ................ G06Q 30/0269 |
| | | | 705/14.66 |
| 2015/0248698 | A1 | 9/2015 | Bhattacharjee et al. |
| 2015/0301990 | A1 | 10/2015 | Karp et al. |
| 2016/0092075 | A1 | 3/2016 | Corbin |
| 2016/0124918 | A1 | 5/2016 | Ying |
| 2016/0205173 | A1 | 7/2016 | Garofalo et al. |
| 2016/0283460 | A1 | 9/2016 | Weald et al. |
| 2017/0236160 | A1 | 8/2017 | Oberoi et al. |

OTHER PUBLICATIONS

"U.S. Appl. No. 16/227,616, Response filed Jun. 2, 21 to Final Office Action dated Feb. 16, 2021", 12 pgs.

"U.S. Appl. No. 16/227,595, Non Final Office Action dated Jun. 25, 2020", 8 pgs.

"U.S. Appl. No. 16/227,595, Notice of Allowance dated Oct. 9, 2020", 8 pgs.

"U.S. Appl. No. 16/227,595, Response filed Sep. 23, 2020 to Non Final Office Action dated Jun. 25, 2020", 5 pgs.

"U.S. Appl. No. 16/227,616, Non Final Office Action dated Jun. 26, 2020", 20 pgs.

"U.S. Appl. No. 16/227,616, Response filed Sep. 28, 2020 to Non Final Office Action dated Jun. 26, 2020", 14 pgs.

Chung, et al., "Mining Publication Records on Personal Publication Web Pages Based on Conditional Random Fields", (2012), 319-326.

Wood, M.D., "Exploiting Semantics for Personalized Story Creation", (2008), 402-409.

"U.S. Appl. No. 16/227,616, Non Final Office Action dated Dec. 14, 2021", 24 pgs.

"U.S. Appl. No. 16/227,616, Response filed Mar. 2, 2022 to Non Final Office Action dated Dec. 14, 2021", 13 pgs.

"U.S. Appl. No. 16/227,616, Final Office Action dated Aug. 3, 2022", 22 pgs.

"U.S. Appl. No. 16/227,616, Notice of Non-Compliant Amendment dated Mar. 28, 2022", 3 pgs.

"U.S. Appl. No. 16/227,616, Response filed May 18, 2022 to Notice of Non-Compliant Amendment dated Mar. 28, 2022", 4 pgs.

* cited by examiner

MEDIA CONTENT ITEM GENERATION FOR A CONTENT SHARING PLATFORM

CROSS-REFERENCE TO RELATED APPLICATION

This application is a continuation of U.S. patent application Ser. No. 16/227,595, filed Dec. 20, 2018, which is related to U.S. patent application Ser. No. 16/227,616, filed Dec. 20, 2018, which are incorporated by reference herein in their entirety.

BACKGROUND

A content sharing platform may receive millions of messages from users desiring to share media content such as audio, images, and video between user devices (e.g., mobile devices, personal computers, etc.). The media content of these messages may be associated with a common geolocation, a common time period, a common event, and so forth. The users of the content sharing platform may comprise a variety of different demographics (e.g., age, gender, location), may have various preferences for content, may have various levels of social activity, and so forth. Some users of the content sharing platform may include publishers of media content (e.g., news, sports, entertainment publishers) that desire to publish media content to be shared to other users of the content sharing platform.

BRIEF DESCRIPTION OF THE DRAWINGS

Various ones of the appended drawings merely illustrate example embodiments of the present disclosure and should not be considered as limiting its scope.

DETAILED DESCRIPTION

Systems and methods described herein relate to generating and publishing media content in a content sharing platform. Conventionally, publishers of media content, such as news media companies, entertainment companies, and the like, employ large teams of highly skilled people to develop media content items (e.g., magazines, newspapers, articles, advertisements, etc.). For example, such entities may hire graphical designers, illustrators, animators, video editors, and so forth. In the pre-Internet days, such entities typically had just one primary media format (e.g., paper publications) and one primary publication channel (e.g., postal delivery or in-store purchase). Today, with the wide variety of media platforms, such as the Internet and numerous content sharing platforms (e.g., Google, Facebook, Snapchat, Yelp, etc.), it is no longer feasible to hire such extensive teams for each different media platform, each with its own technical requirements for publishing content. For example, each media platform may require different technical tools, technical formats for media and data to be published, different timelines, and so forth. Moreover, each media platform may require different schedules for publishing media content, and it is often expected that content be updated at least once a day if not more frequently.

Example embodiments provide a media content publishing platform to allow a publisher to automatically generate media content based on content already created by the publisher. For example, a publisher may create an article or news feed for a website on the Internet. Example embodiments utilize the source data generated for this content to automatically generate media content for a content sharing platform.

Figure 1:
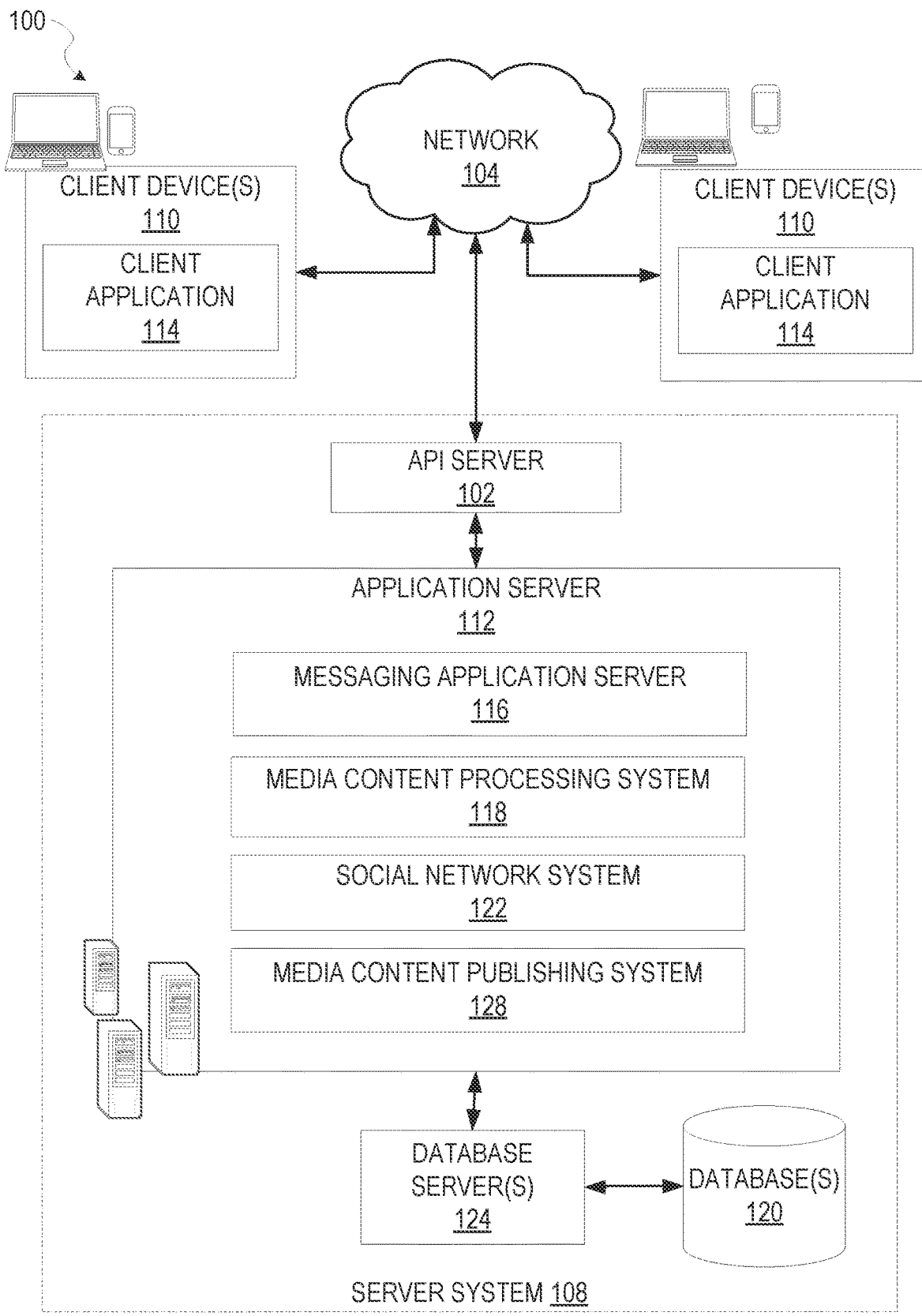
FIG. 1 is a block diagram showing an example messaging system for exchanging data (e.g., messages and associated content) over a network, according to some example embodiments.

FIG. 1 is a block diagram illustrating a networked system 100 (e.g., a messaging system) for exchanging data (e.g., messages and associated content) over a network. In one example, the networked system 100 is a content sharing platform.

The networked system 100 includes multiple client devices 110, each of which hosts a number of client applications 114. Each client application 114 is communicatively coupled to other instances of the client application 114 and a server system 108 via a network 104.

The client device 110 may comprise, but is not limited to, a mobile phone, desktop computer, laptop, portable digital assistant (PDA), smart phone, tablet, ultrabook, netbook, laptop, multi-processor system, microprocessor-based or programmable consumer electronic system, game console, set-top box, computer in a vehicle, wearable device, or any other communication device that a user may utilize to access the networked system 100. In some embodiments, the client device 110 may comprise a display module (not shown) to display information (e.g., in the form of user interfaces). In further embodiments, the client device 110 may comprise one or more of touch screens, accelerometers, gyroscopes, cameras, microphones, global positioning system (GPS) devices, and so forth.

The client device 110 may be a device of a user that is used to create media content items such as video, images (e.g., photographs), and audio, and to send and receive messages containing such media content items, text, and so forth, to and from other users. The client device 110 may be a device of a user that is used to create and edit media overlays and create and access a plurality of media collections. The client device 110 may be a device of a user that is user to generate media content items for publishers of content, as explained in further detail below.

One or more users may be a person, a machine, or other means of interacting with the client device 110. In example embodiments, the user may not be part of the system 100, but may interact with the system 100 via the client device 110 or other means. For instance, the user may provide input (e.g., touch screen input or alphanumeric input) to the client device 110, and the input may be communicated to other entities in the system 100 (e.g., third-party servers, server system 108, etc.) via the network 104. In this instance, the other entities in the system 100, in response to receiving the input from the user, may communicate information to the client device 110 via the network 104 to be presented to the user. In this way, the user may interact with the various entities in the system 100 using the client device 110.

The system 100 may further include the network 104. One or more portions of the network 104 may be an ad hoc network, an intranet, an extranet, a virtual private network (VPN), a local area network (LAN), a wireless LAN (WLAN), a wide area network (WAN), a wireless WAN (WWAN), a metropolitan area network (MAN), a portion of the Internet, a portion of the public switched telephone network (PSTN), a cellular telephone network, a wireless network, a WI-FI network, a WiMax network, another type of network, or a combination of two or more such networks.

The client device 110 may access the various data and applications provided by other entities in the system 100 via a web client (e.g., a browser, such as the Internet Explorer® browser developed by Microsoft® Corporation of Redmond, Wash. State) or one or more client applications 114. The client device 110 may include one or more client applications 114 (also referred to as "apps") such as, but not limited to, a web browser, a messaging application, an electronic mail (email) application, an e-commerce site application, a mapping or location application, a media overlay application, an interactive messaging application, a media content generation and publishing application, and the like.

In some embodiments, one or more client applications 114 may be included in a given one of the client devices 110, and configured to locally provide the user interface and at least some functionalities, with the client application 114 configured to communicate with other entities in the system 100 (e.g., third-party servers, server system 108, etc.), on an as-needed basis, for data and/or processing capabilities not locally available (e.g., to process user queries, to authenticate a user, to verify a method of payment, etc.). Conversely, one or more client applications 114 may not be included in the client device 110, and then the client device 110 may use its web browser to access the one or more applications hosted on other entities in the system 100 (e.g., third-party servers, server system 108, etc.).

In one example, a client application 114 may be a messaging application that allows a user to take a photograph or video, add a caption to or otherwise edit the photograph or video, and then send the photograph or video to another user. In one example, the message may be ephemeral and be removed from a receiving user device after viewing or after a predetermined amount of time (e.g., 10 seconds, 24 hours, etc.). An ephemeral message refers to a message that is accessible for a time-limited duration. An ephemeral message may be a text, an image, a video, and other such content that may be stitched together in accordance with embodiments described herein. The access time for the ephemeral message may be set by the message sender. Alternatively, the access time may be a default setting or a setting specified by the recipient. Regardless of the setting technique, the message is transitory.

The messaging application may further allow a user to create a gallery or message collection (also referred to herein as a "media collection"). A gallery may be a collection of photos and videos which may be viewed by other users "following" the user's gallery (e.g., subscribed to view and receive updates in the user's gallery). In one example, the gallery may also be ephemeral (e.g., lasting 24 hours, lasting for a duration of an event (e.g., during a music concert, sporting event, etc.), or lasting another predetermined time).

An ephemeral message may be associated with a message duration parameter, the value of which determines an amount of time that the ephemeral message will be displayed to a receiving user of the ephemeral message by the client application 114. The ephemeral message may be further associated with a message receiver identifier and a message timer. The message timer may be responsible for determining the amount of time the ephemeral message is shown to a particular receiving user identified by the message receiver identifier. For example, the ephemeral message may only be shown to the relevant receiving user for a time period determined by the value of the message duration parameter.

In another example, the messaging application may allow a user to store photographs and videos and create a gallery that is not ephemeral and that can be sent to other users. For example, a user may assemble photographs and videos from a recent vacation to share with friends and family.

In another example, the client application 114 may be a media publishing application (also referred to herein as a "media content generating and publishing application") that allows a user to generate and publish media content items. For example, a user can create a message or media content item comprising the latest news for a particular sports team, politics, entertainment, a particular product or service, an advertisement, or the like. In one example, the media content item can be part of a "channel" in a content sharing platform for the particular publisher. A media content item may comprise one or more of images, video, text, or the like.

In one example, the media content item created by the publisher may be ephemeral and be removed from a receiving user device after viewing or after a predetermined amount of time (e.g., 10 seconds, 24 hours, etc.). As explained above, an ephemeral media content item or message refers to a message that is accessible for a time-limited duration. An ephemeral message may be a text, an image, a video, and other such content that may be stitched together in accordance with embodiments described herein. The access time for the ephemeral message may be set by the message sender. Alternatively, the access time may be a default setting or a setting specified by the publisher or recipient. Regardless of the setting technique, the message is transitory.

The media publishing application may further allow a user to create a gallery or message collection (also referred to herein as a "media collection") comprising a plurality of media content items (e.g., based on an RSS or Atom feed as described below). A media collection may be a collection of photos and videos which may be viewed by other users "following" the publishers media collection or channel (e.g., subscribed to view and receive updates in the publisher's media collection or channel). In one example, the media collection may also be ephemeral (e.g., lasting 24 hours, lasting for a duration of an event (e.g., during a music concert, sporting event, etc.), or lasting another predetermined time).

As explained above, an ephemeral message or media content item may be associated with a message duration parameter, the value of which determines an amount of time that the ephemeral message will be displayed to a receiving user of the ephemeral message by the client application 114. The ephemeral message may be further associated with a message receiver identifier and a message timer. The message timer may be responsible for determining the amount of time the ephemeral message is shown to a particular receiving user identified by the message receiver identifier. For example, the ephemeral message may only be shown to the relevant receiving user for a time period determined by the value of the message duration parameter.

The server system 108 may provide server-side functionality via the network 104 (e.g., the Internet or a wide area network (WAN)) to one or more client devices 110 and/or one or more third-party servers (not shown). The server system 108 may include an application programming interface (API) server 102, an application server 112, a messaging application server 116, a media content processing system 118, a social network system 122, and a media content publishing system 128, which may be communicatively coupled with each other and with one or more data storage(s), such as database(s) 120.

The server system 108 may be a cloud-computing environment, according to some example embodiments. The server system 108, and any servers associated with the server system 108, may be associated with a cloud-based application, in one example embodiment.

The one or more database(s) 120 may be storage devices that store information such as untreated media content, original media content from users (e.g., high-quality media content), processed media content (e.g., media content that is formatted for sharing with client devices 110 and viewing on client devices 110), context data related to a media content item, context data related to a user device (e.g., computing or client device 110), media overlays, media overlay smart widgets or smart elements, user data, user device information, media content (e.g., video and images), media content data (e.g., data associated with video and images), computing device context data, serialized data, session data items, user profile data, publisher profile data, selectors and selector data, creative templates and associated data, generated media content items, and so forth. The one or more databases 120 may further store information related to third-party servers, third-party applications, client devices 110, client applications 114, users, and so forth.

The one or more database(s) 120 may include cloud-based storage external to the server system 108 (e.g., hosted by one or more third-party entities external to the server system 108). While the storage devices are shown as database(s) 120, it is to be understood that the system 100 may access and store data in storage devices such as databases 120, blob storages, and other types of storage methods.

The system 100 may further include one or more third-party servers (not shown). The one or more third-party servers may include one or more third-party application(s). The one or more third-party application(s), executing on the third-party server(s), may interact with the server system 108 via the API server 102 via a programmatic interface provided by the API server 102. For example, one or more of the third-party applications may request and utilize information from the server system 108 via the API server 102 to support one or more features or functions on a website hosted by a third party or an application hosted by the third party. The third-party website or application, for example, may provide functionality that is supported by relevant functionality and data in the server system 108.

Accordingly, each client application 114 is able to communicate and exchange data with other client applications 114 and with the server system 108 via the network 104. The data exchanged between client applications 114, and between a client application 114 and the server system 108, includes functions (e.g., commands to invoke functions) as well as payload data (e.g., text, audio, video, or other multimedia data).

The server system 108 provides server-side functionality via the network 104 to a particular client application 114. While certain functions of the system 100 are described herein as being performed by either a client application 114 or the server system 108, it will be appreciated that the location of certain functionality either within the client application 114 or within the server system 108 is a design choice. For example, it may be technically preferable to initially deploy certain technology and functionality within the server system 108, but to later migrate this technology and functionality to the client application 114 where a client device 110 has a sufficient processing capacity.

The server system 108 supports various services and operations that are provided to the client application 114. Such operations include transmitting data to, receiving data from, and processing data generated by the client application 114. This data may include message content, client device information, geolocation information, media annotation and overlays, message content persistence conditions, social network information, live event information, date and time stamps, media content (e.g., video and images), media content data (e.g., data associated with video and images), media content items, and user data, as examples. Data exchanges within the networked system 100 are invoked and controlled through functions available via user interfaces (UIs) of the client application 114.

In the server system 108, the API server 102 is coupled to, and provides a programmatic interface to, the application server 112. The application server 112 is communicatively coupled to a database server 124, which facilitates access to the one or more database(s) 120 in which is stored data associated with messages processed by the application server 112.

The API server 102 receives and transmits message data (e.g., commands and message payloads) between the client device 110 and the application server 112. Specifically, the API server 102 provides a set of interfaces (e.g., routines and protocols) that can be called or queried by the client application 114 in order to invoke functionality of the application server 112. The API server 102 exposes various functions supported by the application server 112, including account registration; login functionality; the sending of messages, via the application server 112, from a particular client application 114 to another client application 114; the sending of media files (e.g., images or video) from a client application 114 to the messaging application server 116, for possible access by another client application 114; the setting of a collection of media data (e.g., a gallery, story, message collection, or media collection); the retrieval of such collections; the retrieval of a list of friends of a user of a client device 110; the retrieval of messages and content; the adding of friends to and deletion of friends from a social graph; the location of friends within a social graph; opening an application event (e.g., relating to the client application 114); generating and publishing media content items; and so forth.

The application server 112 hosts a number of applications and subsystems, including the messaging application server 116, the media content processing system 118, the social network system 122, and the media content publishing system 128. The messaging application server 116 implements a number of message processing technologies and functions, particularly related to the aggregation and other processing of content (e.g., textual and multimedia content) included in messages received from multiple instances of the client application 114. The text and media content from multiple sources may be aggregated into collections of content (e.g., called stories, galleries, or media collections). These collections are then made available, by the messaging application server 116, to the client application 114. Other processor- and memory-intensive processing of data may also be performed server-side by the messaging application server 116, in view of the hardware requirements for such processing.

The application server 112 also includes the media content processing system 118, which is dedicated to performing various media content processing operations, typically with respect to images or video received within the payload of a message at the messaging application server 116. The media content processing system 118 may access one or more data storages (e.g., database(s) 120) to retrieve stored data to use in processing media content and to store results of processed media content.

The social network system 122 supports various social networking functions and services, and makes these functions and services available to the messaging application server 116. To this end, the social network system 122 maintains and accesses an entity graph within the database 120. Examples of functions and services supported by the social network system 122 include the identification of other users of the networked system 100 with whom a particular user has relationships or whom the particular user is "following," and also the identification of other entities and interests of a particular user.

The messaging application server 116 may be responsible for generation and delivery of messages between users of client devices 110. The messaging application server 116 may utilize any one of a number of message delivery networks and platforms to deliver messages to users. For example, the messaging application server 116 may deliver messages using electronic mail (email), instant message (IM), Short Message Service (SMS), text, facsimile, or voice (e.g., Voice over IP (VoIP)) messages via wired networks (e.g., the Internet), plain old telephone service (POTS), or wireless networks (e.g., mobile, cellular, WIFI, Long Term Evolution (LTE), or Bluetooth).

Figure 2:
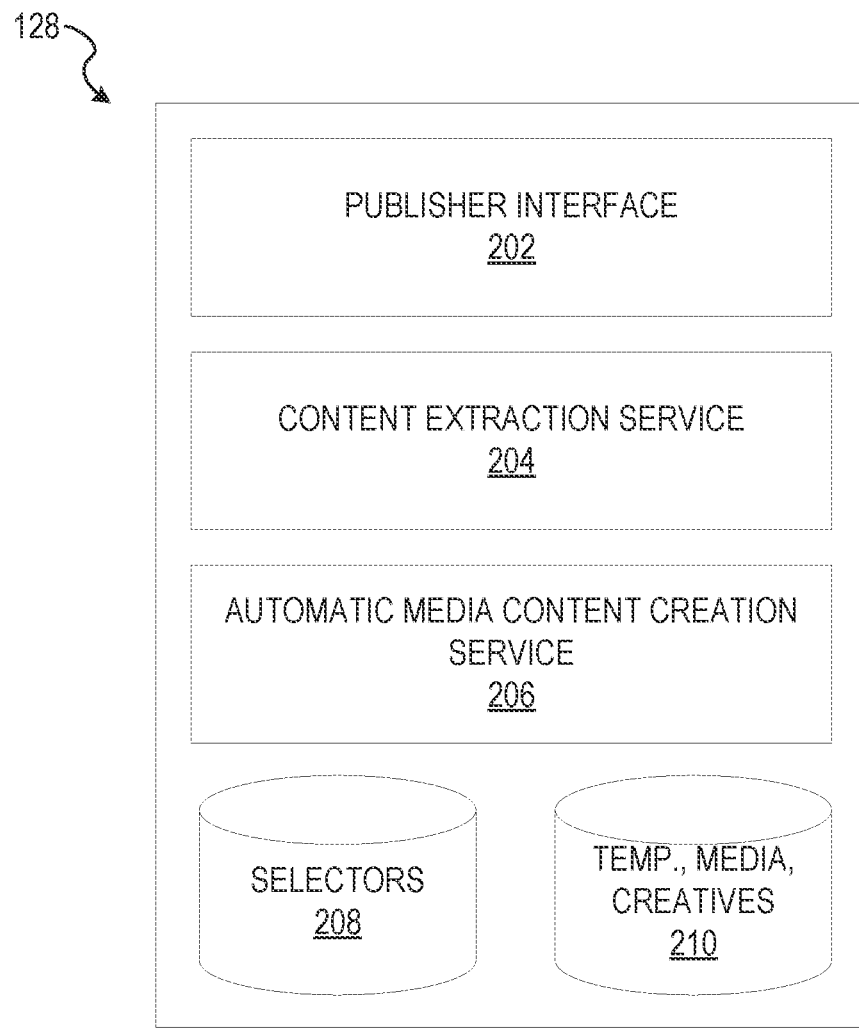
FIG. 2 is a block diagram illustrating further details regarding the messaging system, according to some example embodiments.

The media content publishing system 128 supports various functionality related to generating and publishing media content items, as described in further detail below. FIG. 2 is a block diagram illustrating further details of the media content publishing system 128, according to some example embodiments. In this example, the media content publishing system 128 comprises a publisher interface 202, a content extraction service 204, an automatic media content creation service 206, and one or more databases 208 that stores selectors and related data, and database 210 that stores templates, media, creatives (e.g., media content items), and related data. The databases 208 and 210 are shown as separate databases in the example in FIG. 2; however, it is to be understood that the databases 208 and 210 could be one database or two or more databases.

The publisher interface 202 is a user interface for generating media content items. In one example, the publisher interface 202 is part of a media publishing application that allows users to generate and publish media content (e.g., messages or media content items). In one example, the publisher interface 202 resides in the media content publishing system 128 and is accessed via one or more client devices 110. In another example, the publisher interface 202 resides on one or more client devices 110, and functionality related to the media publishing application is accessed via the media content publishing system 128. In yet another example, some functionality of the publisher interface 202 may reside on one or more client devices 110, and some of the functionality of the publisher interface 202 may reside on the media content publishing system 128. The publisher interface 202 provides a user interface for a user to generate media content, and also provides location information for source data, one or more selectors, and related data to the content extraction service 204. The location information indicates an online location at which the source data is available or the online or network location at which the source data is published.

The content extraction service 204 is responsible for receiving and using the location information to access source data and parse the source data to generate specified content for the one or more selectors, according to rules associated with each selector, as described in further detail below. The content extraction service 204 provides the specified content to the publisher interface 202 and/or the automatic media content creation service 206.

The automatic media content creation service 206 is responsible for generating templates, populating templates with the specified content from the content extraction service 204, providing generated and populated templates to the publisher interface 202, and so forth as described in further detail below. The automatic media content creation service 206 is also responsible for creating all media fields needed to satisfy a template.

Figure 3:
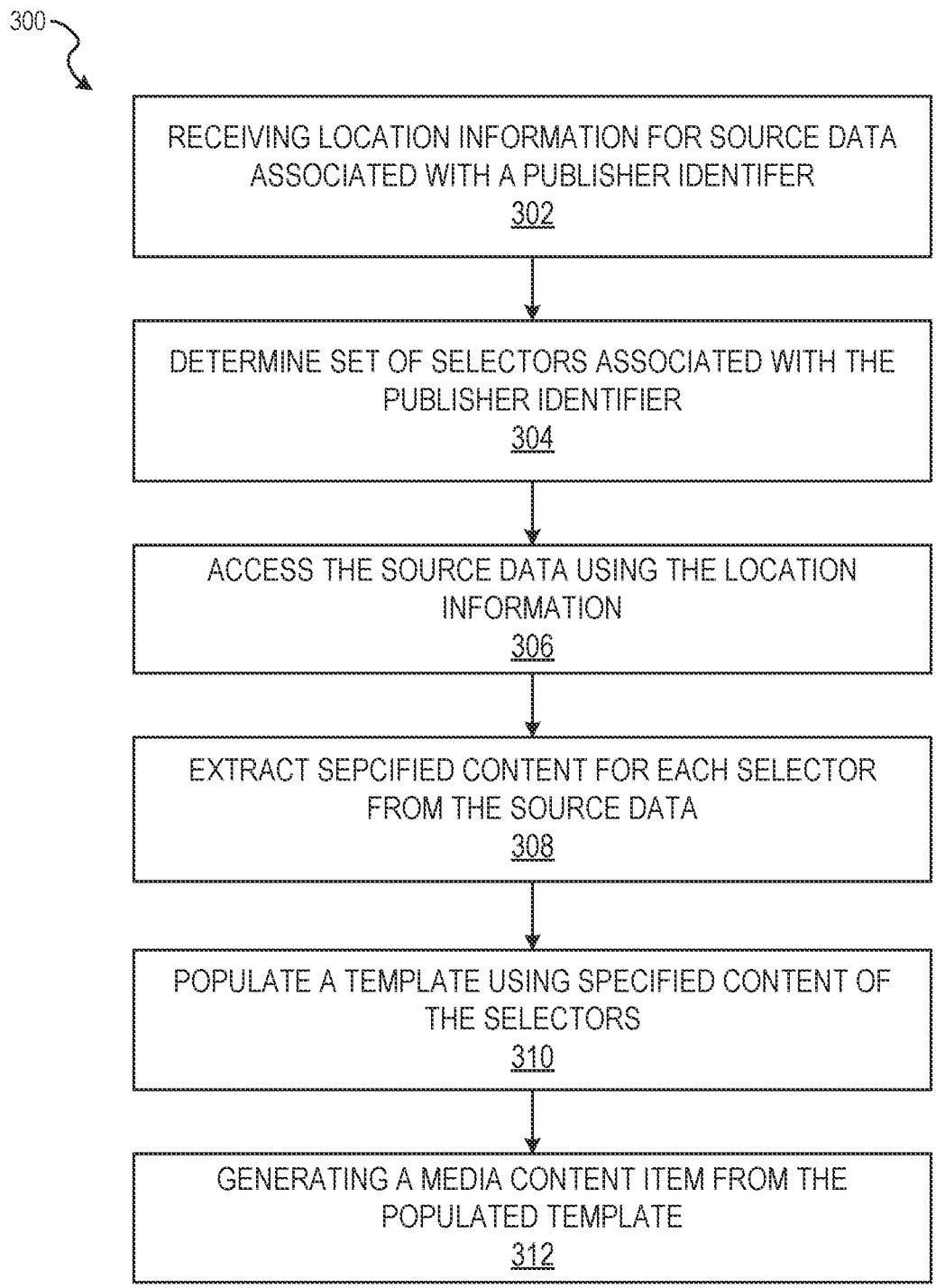
FIG. 3 is a flow chart illustrating aspects of a method, according to some example embodiments.

FIG. 3 is a flow chart illustrating aspects of a method 300 for generating a media content item for publication, according to some example embodiments. For illustrative purposes, the method 300 is described with respect to the networked system 100 of FIG. 1 and the block diagram of FIG. 2. It is to be understood that the method 300 may be practiced with other system configurations in other embodiments.

In operation 302, a server system (e.g., server system 108 or media content publishing system 128) receives location information for source data associated with a publisher identifier. In one example, location information comprises a mechanism by which the source data is provided (e.g., by a publisher server system or computing device) to the server system. For example, location information can be a URL at which source data is pulled by the server system, an API for external system (e.g., a publisher server system or computing device) to push source data, or the like. In one example, the source data is a form of data such as a JSON file, a web page, an RSS feed, an Atom feed, a product catalog, and so forth.

In one example, source data is an RSS or Atom feed (which is a structured data file), and this source data may be specified by a URL for the feed file. In another example, the source data is a webpage and this source data may be specified by a URL for the webpage. In yet another example, the source data is a product catalog and this source data is provided via a third-party system enabled by an externally accessible API.

Figure 4:
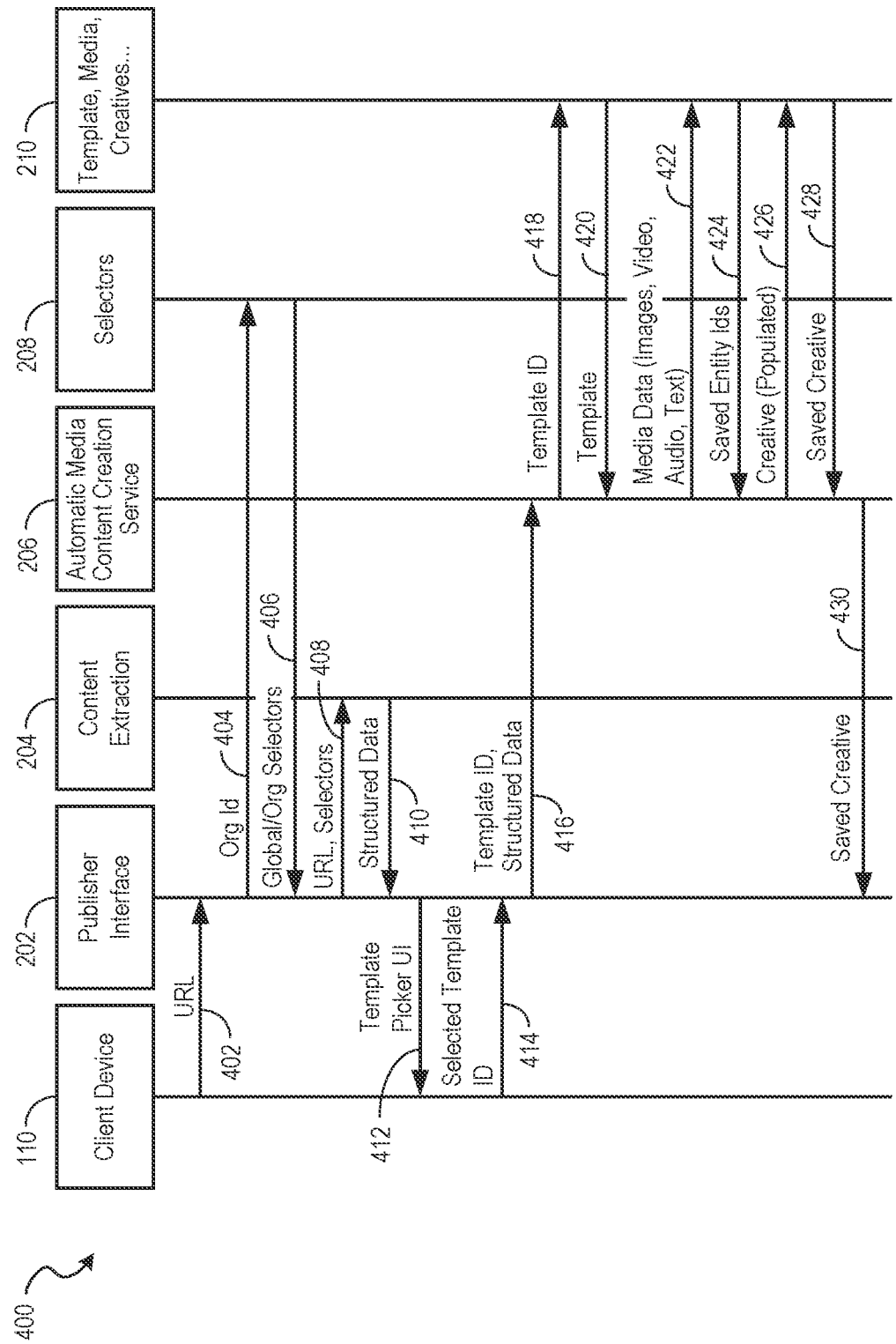
FIGS. 4-8 illustrate example graphical user interfaces, according to some example embodiments.

As shown in in FIG. 4 at operation 402, a client device 110 provides, to publisher interface 202, a URL for accessing data (e.g., one or more websites) to use for automatically generating a media content item (also referred to herein as a "creative"). In other examples, other location information may be provided for the source data.

The source data may be a webpage (e.g., an article or product information), in one example. The source data may comprise structured and/or unstructured data. Structured data is information comprising a high degree of organization. For example, structured data comprises discretely defined fields (e.g., a title field, an author field, an image field, a video field, etc.). Unstructured data, on the other hand, lacks any specified structure.

Figure 5:
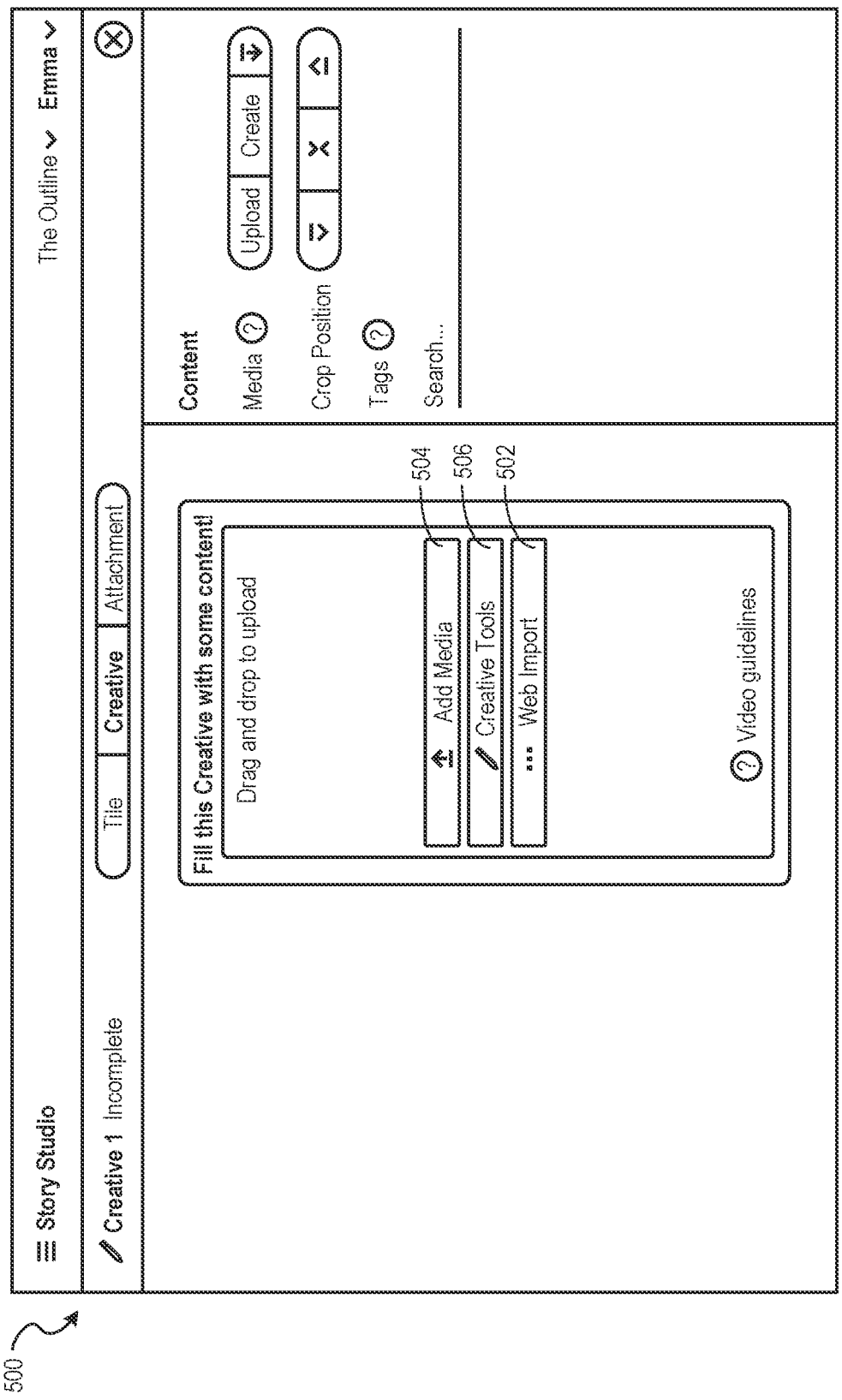

In one example, the location information is provided via a media publishing application via a client device 110. For example, a user (e.g., a creator and/or publisher of content)

may access a media publishing application via client device 110 to create a media content item (also referred to herein as a "creative"). FIG. 5 illustrates an example display 500 illustrating a user interface of a media publishing application. The user interface may allow a user to create a media content item from scratch by providing an option 504 to add media and an option to use creative tools 506. The media publishing application may also allow a user to have a media content item to be automatically generated based on a website, or a data fee (e.g., RSS or Atom feed), that has already been created by the user, via a web import option 502.

Figure 6:
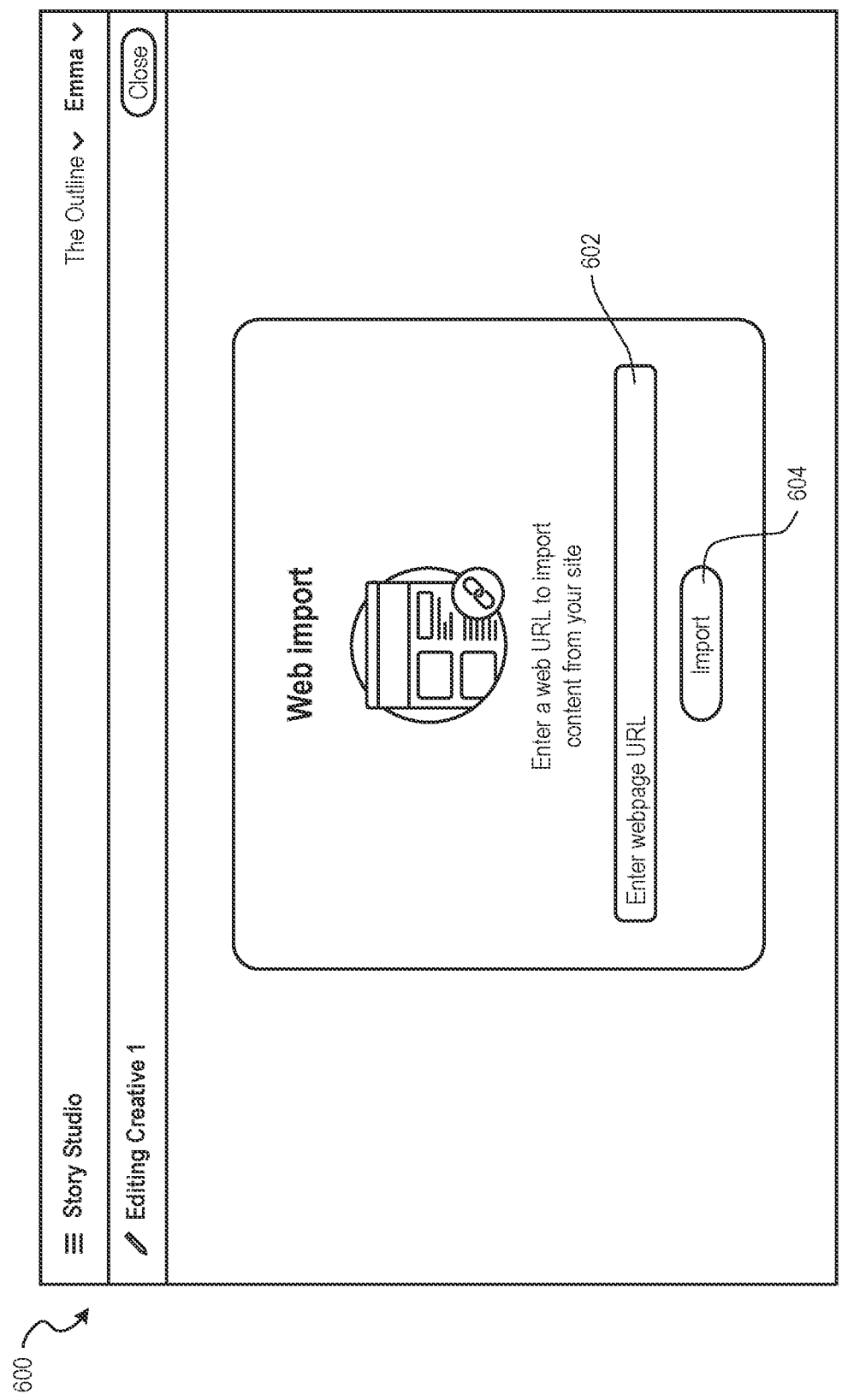

FIG. 6 illustrates an example display 600 illustrating the user interface of the media publishing application after a user has selected the web import option 502. In user interface, an input field 602 is provided for a user to enter a URL (in this example) to import content from a website (e.g., source data). The user may then start the process of importing data from the website by selecting the import option 604. The URL is then sent by the client device 110 to the server system. In one example, a publisher identifier (e.g., Org Id in operation 404 of FIG. 4) is also provided to the server system. For example, the computing device may also send a publisher identifier along with the URL to the server system. In another example, the server system determines the publisher identifier based on the URL or other data (e.g., user data, login information, etc.) provided via the publisher interface 202.

Returning to FIG. 3, in operation 304, the server system determines a set of selectors associated with the publisher identifier. A selector is a component or entity that defines what data (e.g., specified data) to extract from source data (e.g., from a webpage associated with the URL or one or more URLs listed in an RSS or Atom feed). Accordingly, each selector or the set of selectors comprises specified content to extract from the source data and one or more rules for extracting the specified content. For example, the set of selectors may comprise a headline selector, an author selector, an image selector, a video selector, and so forth. A title selector may specify a title for the media content item and rules for how to find the title information within the source data. An author selector may specify the author for the source data and rules for how to find the author information within the source data. An image selector and a video selector may specify an image and a video for the media content item and rules for how to find the image and video within the source data.

Using a specific example, a selector may be used for extracting a title from a webpage. Two rules may be provided in the selector that describes paths into the document (webpage) for finding the title. The first rule may be "h2.title" which looks for elements of type h2 with class name "title." The second rule may be "article header h" which looks for an element of type h that is contained within an element of type header that is contained within an element of type article.

Selectors may include global selectors and organization-specific selectors. Global selectors are general or commonly used selectors that are used to identify things like the title, description, or primary image of a webpage or document (e.g., source data). Global selectors may be used across publishers (e.g., regardless of a publisher identifier). Global selectors may be created by generating a global list of named template fields available (e.g., title/headline, description/body, background image/video, etc.) and associating each named field an extensible set of rules for extracting content from source data (e.g., webpage or other document) for the named field.

Organization-specific selectors may be publisher-specific. For example, publishers may have non-standard webpage or document structure (e.g., source data) or have unique data available somewhere on the page that they want returned as structured data. Organization-specific selectors can be defined per organization (e.g., per publisher and associated with a publisher identifier). A user associated with the organization or publisher can define one or more organization-specific selectors, for example, via a media content generation application and save the organization-specific selectors. The defined organization selectors are sent by the computing device (e.g., client device 110) to the server system and the server system stores them in one or more databases (e.g., database 120 or database 208).

In one example, a selector can be associated with a specific data type. For example, a selector can be associated with a text, image, or media data type.

The server system may access one or more databases (e.g., database(s) 120, selectors database 208) to determine which selectors, of a plurality of selectors, are associated with the publisher identifier. In one example, the set of selectors are provided to the publisher interface 202 at operation 406, as shown in FIG. 4. In operation 408, the publisher interface 202 provides the URL and selectors to the content extraction service 204.

In operation 306 of FIG. 3, the server system accesses the source data using the location information. For example, the server system uses the URL to access the webpage. In operation 308, the server system (e.g., via content extraction service 204) extracts specified content for each selector from the source data. For example, for each selector in the set of selectors associated with the publisher identifier, the server system extracts the specified content using the rules specified in each selector (e.g., a tide, an image, a video, an author, etc.). For example, the server system may parse the webpage to determine the specified content using the one or more rules specified in the selector. In one example, the specified content is stored as structured data associated with the selector.

It is possible that the server system will not be able to find all the specified data for each of the selectors associated with the publisher identifier. For example, a webpage may comprise a title, an image, a video, but not an author. Thus, the server system would only be able to populate a subset of the selectors with structured data from the website. In operation 410 of FIG. 4, the content extraction service 204 returns the structured data for the selectors for which it found the specified data, to the publisher interface 202. In one example, the content extracted is added to the user's media library (e.g., a media library associated with a publisher identifier).

In operation 310 of FIG. 3, the server system populates a template using the specified content of the selectors. For example, the server system retrieves a plurality of templates for generating a media content item. The plurality of templates may comprise templates for any publisher, templates specific to a publisher identifier, or a combination of the two. For example, the server system may access one or more databases (e.g., databases 120 and/or 210) that stores templates and retrieve the templates associated with the publisher identifier and/or global templates not specific to any particular publisher identifier.

Figure 7:
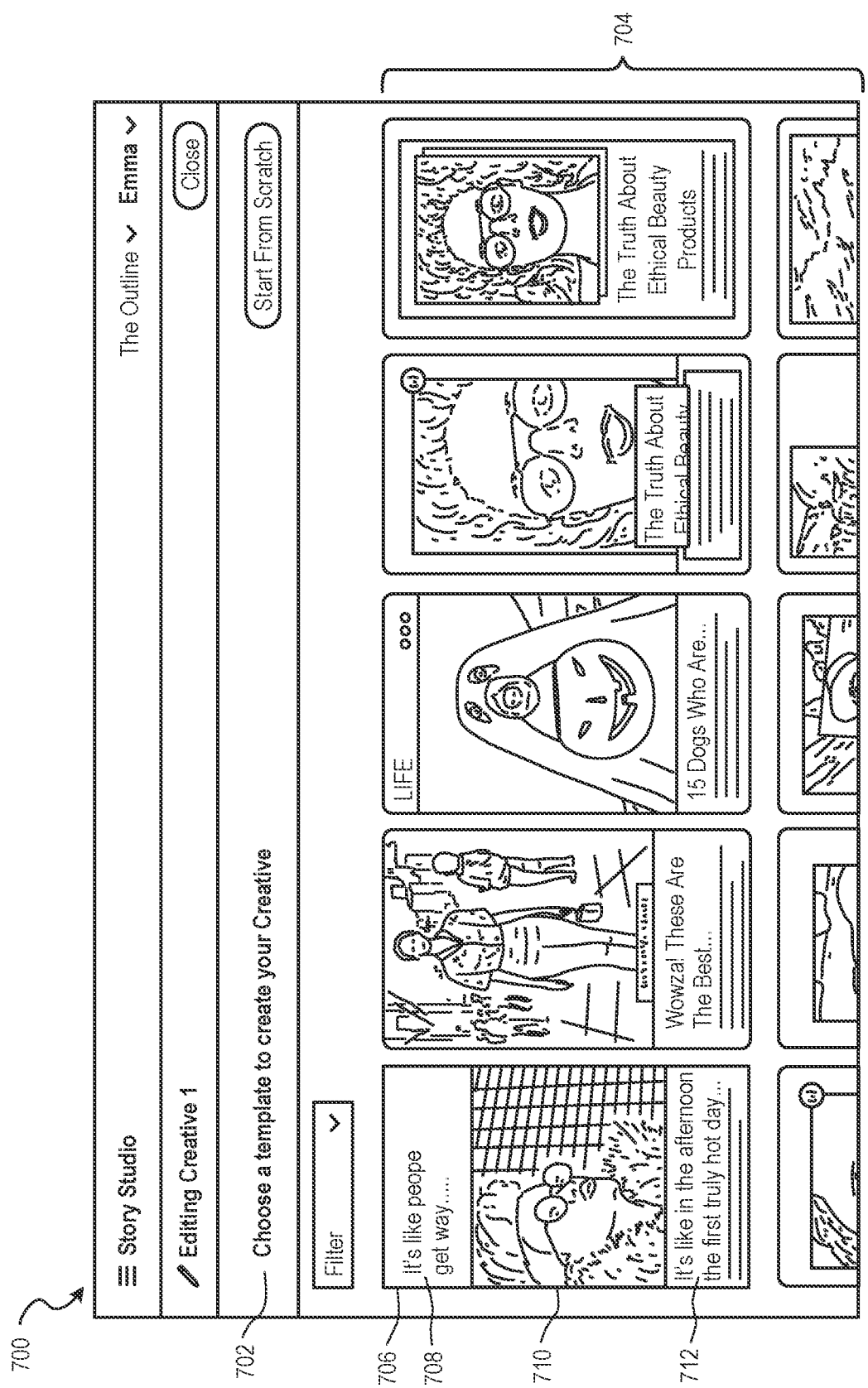

In one example embodiment, the server system determines one template of the plurality of templates to use to generate a media content item. In one example, the server system determines the template based on receiving a selection of the template from the plurality of templates. For example, the publisher interface 202 provides a template picker user interface at operation 412 of FIG. 4 and receives a selected template identifier at operation 414. FIG. 7 illustrates an example display 700 that provides an option 702 to select a template, from a plurality of templates 704, to create a media content item (or "Creative"). In one example, all available templates are displayed in the display 700. In another example, only the relevant templates are displayed in the display 700 (e.g., templates that comprise regions associated with the selectors for which specified content was extracted from the source data). In this example, templates with a video field or region would not be displayed if the extracted content does not include any video media, or a slideshow template with three background images would not be displayed unless the provided content has at least three valid background images, as examples. In yet another example, the templates are ranked and displayed in the order of most relevant to least relevant.

Each template has one or more layers or regions associated with one or more selectors. For example, template 706 comprises a title region 708, an image region 710, and a description region 712, which may be respectively associated with a title selector, an image selector, and a description selector. In this example, the publisher interface 202 provides the selected template identifier and the structured data to the automatic media content creation service 206 to generate the media content item, as shown in operation 416 of FIG. 4.

In another example, the server system determines the one template of the plurality of templates automatically based on determining which templates comprise selectors corresponding to the specified content in the subset of the set of selectors. For example, the specified content may comprise a title, an author, and a video. The server system determines which templates comprise a title, an author, and a video and selects one template from those templates that comprise those regions. For example, since the server system does not have content for an image or an author, it may not want to choose templates that have an author region. Additionally, or in the alternative, the server system may determine the template of the plurality of templates based on popularity of the templates, relevancy of the template, and the like. In one example, each template has an associated template identifier.

The server system retrieves the template based on the template identifier. For example, in operation 418 of FIG. 4, the automatic media content creation service 206 uses the template identifier (ID) to access one or more databases 210 that comprise template data and retrieves the template associated with the template ID in operation 420. The automatic media content creation service 206 may also retrieve any media data for the template (e.g., images, video, audio, text), as shown in operation 422. For example, a template may comprise media data such as images (e.g., logos and stock images), stock video, animation, and so forth. For example, a template may comprise a logo for an entity associated with the publisher identifier, an image or animation that swooshes in from a certain angle, and so forth. This media data may each be associated with stored entity identifiers (IDs) that are provided to the automatic media content creation service 206 at operation 424.

The server system populates each region of the template using the media data and the specified content for the selector associated with each region. For example, if a template has a title region and an image region, the server system maps the title region with the specified content of the title selector and the image region with the specified content of the image selector. Other regions that are not associated with a selector (or for which there is no specified data available) may be populated with the media data (or left blank).

In one example, for layers or regions that contain media, such as image, video, or audio, the media objects will be automatically created. For example, the media objects will be downloaded from their source location, uploaded and stored by the server system, and associated with a media entity that can be assigned to a new media content item. For regions that contain text, the properly sized and wrapped text can be converted into a graphical format (e.g., Scalable Vector Graphics (SVG), raster-based graphic format, or other vector graphic format) and assigned to the regions in which it is used. In one example, multiple regions of a template or media content item can have the same source input. For example, Image 1 and Image 2 can both be mapped to a single image field in the structured data extracted from the source data.

Returning to FIG. 3, in operation 312, the server system generates a media content item from the populated template. For example, the media content item is generated by transcoding the template layers into a single video file. In one example, the server system also defines a structured data record of the original creative layers, files, and any modifications/edits/transformations. This structured data record can be used to modify the media content item in the future.

The media content item is then stored in one or more databases 210, as shown in operation 426 of FIG. 4, and the saved media content item is provided to the automatic media content creation service 206, as shown in operation 428, which provides the media content item to the publisher interface 202, as shown in operation 430. In this way the server system causes the media content item to be displayed on a client device 110.

Figure 8:
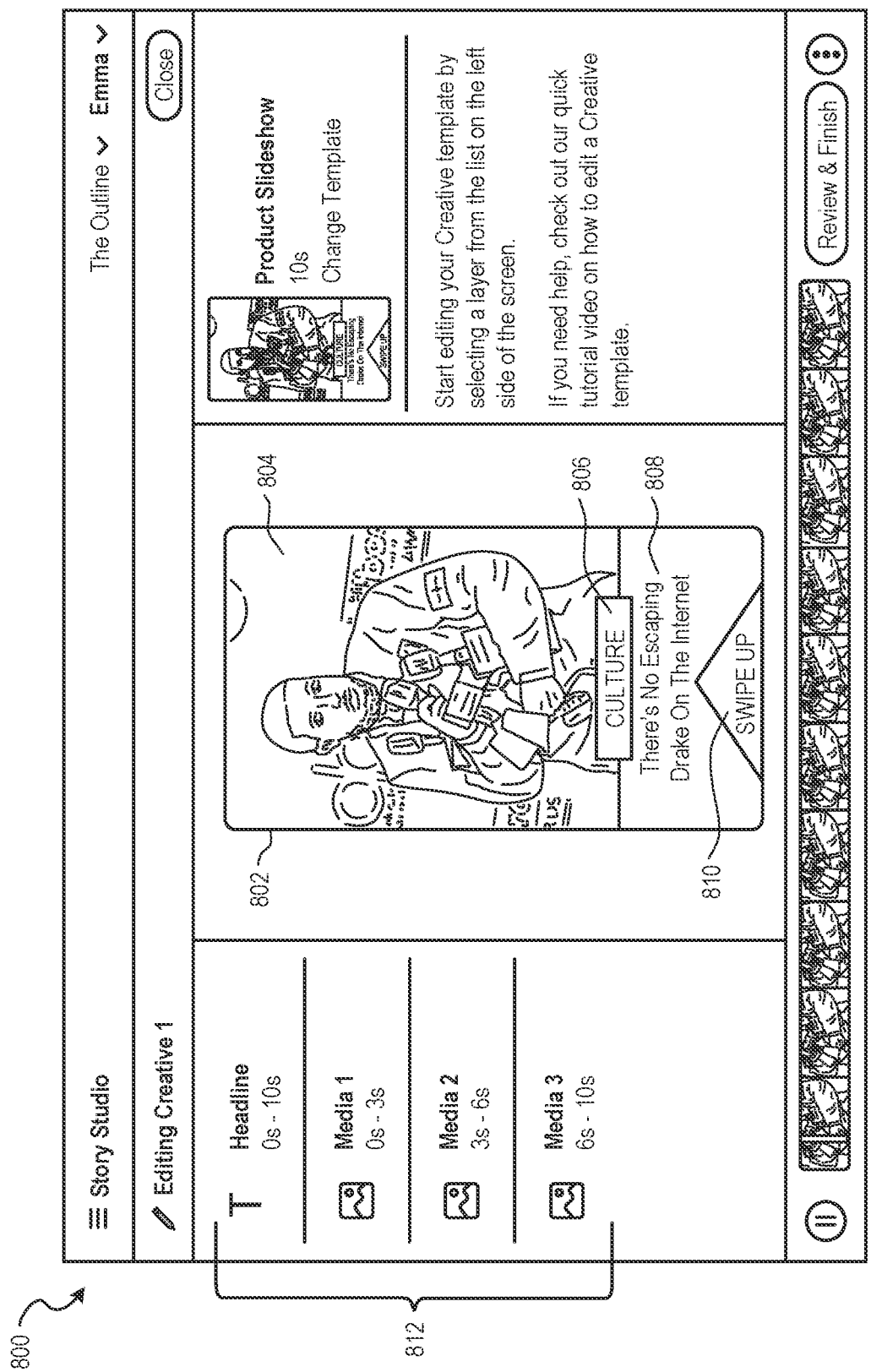

FIG. 8 illustrates an example display 800 that displays the generated media content item 802. In this example, the media content item 802 comprises an image, a subject 806, and a title 808. The media content item 802 may also provide an option 810 to access the full article or content related to the media content item 802. For example, if a user swipes up on option 810, the display 800 displays the full article about "There's No Escaping Drake On The Internet." The full article portion of the media content item 802 may be populated using the source data (e.g., to display the entire article of the source data). The display 800 may further provide options 812 for editing media content items by allowing the options 812 to edit various layers or regions of the media content item (e.g., headline, media 1, media 2, media 3).

Once any edits have been made to the media content item (e.g., to the media content item 802), the computing device (e.g., client device 110) sends the final media content item to the server system. The server system saves the final media content item. For example, the server system receives updated content for at least one region of the generated media content item from the computing device and stores the updated content. In another example, no updates are made to the media content item and the generated media content item is stored as is by the server system. In yet another example, the media content item is not displayed on a client device but is instead automatically published to a content sharing platform once it is generated.

In one example, a second template can be selected to generate a second media content item. The server system may determine the second template (e.g., receive a selection of a second template), populate each region of the second template using specified content for the selector associated with each region of the template, as described above. The server system can use updated content for the at least one region to populate the at least one region of the second template. The server system can generate a second media content item from the populated second template and cause display of the generated second media content item on the computing device, as explained above. In this way, changes made to one template can be used to populate a second template so that a user does not need to make the change again.

The server system can publish the generated media content item to a content sharing platform. For example, the server system can cause the generated media content item to be accessible to one or more users via a messaging application or webpage accessible via a client device. In this way, a plurality of users can view and interact with the generated media content item.

Figure 9:
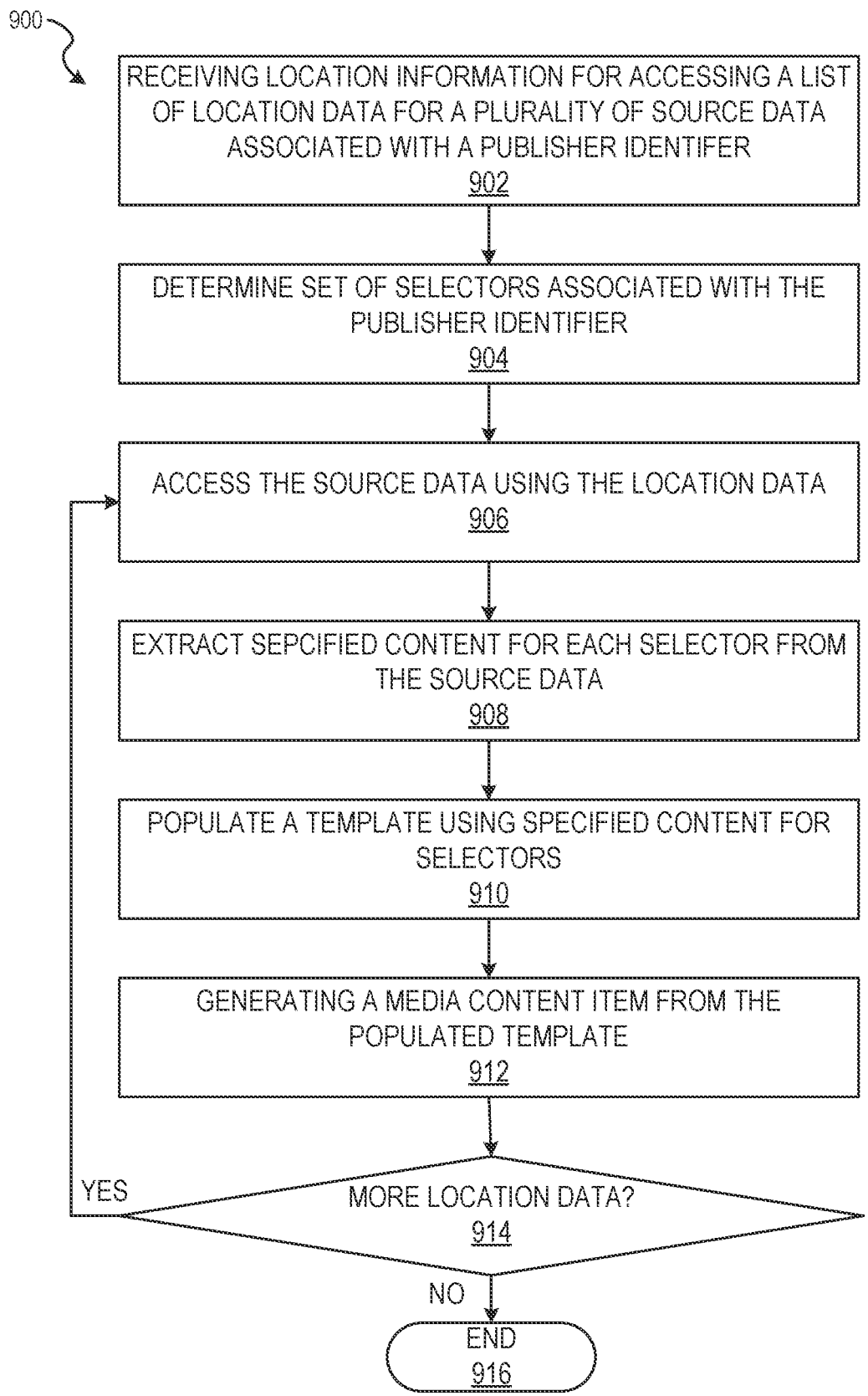
FIG. 9 is a flow chart illustrating aspects of a method, according to some example embodiments.

FIG. 9 is a flow chart illustrating aspects of a method 900 for generating a media content item for publication, according to some example embodiments. For illustrative purposes, the method 900 is described with respect to the networked system 100 of FIG. 1 and the block diagram of FIG. 2. It is to be understood that the method 900 may be practiced with other system configurations in other embodiments.

In operation 902, a server system (e.g., server system 108 or media content publishing system 128) receives location information for accessing a list of location data for a plurality of source data associated with a publisher identifier. In this example, the location information is a URL or other location information for an RSS feed or Atom feed, or other type of feed. RSS (Rich Site Summary or Really Simple Syndication) or Atom is a format that provides a means for transmitting and updating news (or other media) in an automated way. For example, publishers (e.g., news websites) can publish an RSS feed, which can be regularly updated with the latest headlines and/or articles. The RSS or Atom feed can be in XML format, in one example. An RSS or Atom "feed" is essentially a list of articles or content in a standardized, machine-readable format. The feed comprises entries, such as links (e.g., URLs) to websites or links to content on a website, along with various metadata. In this example, location data is a URL and source data is associated with a webpage. Example embodiments provide for atomically generating media content items for each of the entries in an RSS or Atom feed. Example embodiments further provide for generating a media collection comprising media content items generated from an RSS or Atom feed.

As described above with respect to operation 302 of FIG. 3, the server system can receive location information for accessing the list of location data for a plurality of source data associated with a publisher identifier, via a publisher interface 202. For example, as shown in in FIG. 4 at operation 402, a client device 110 provides, to publisher interface 202, a URL or RSS/Atom feed for accessing data (e.g., one or more websites) to use for automatically generating a media content item (also referred to herein as a "creative"). In other examples, other location information may be provided for the source data.

The source data may be a webpage (e.g., an article or product information), in one example. The source data may comprise structured and/or unstructured data, as described above.

In one example, the location information is provided via a media publishing application via a client device 110. For example, a user (e.g., a creator and/or publisher of content) may access a media publishing application via a client device 110 to create a media content item (also referred to herein as a "creative"). As described above, FIG. 5 illustrates an example display 500 of a media publishing application. The display 500 may allow a user to create a media content item from scratch by providing an option 504 to add media and an option to use creative tools 506. The media publishing application may also allow a user to have a media content item to be automatically generated based on a website, or an RSS or Atom feed, that has already been created by the user, via a web import option 502.

FIG. 6 illustrates an example display 600 of the media publishing application after a user has selected the web import option 502. In display 600, an input field 602 is provided for a user to enter a URL (in this example) to import content from a website (e.g., source data). In another example, the user can enter an RSS or Atom feed to import content from a plurality of websites (e.g., source data) listed in the RSS or Atom feed. The user may then start the process of importing data from the website by selecting the import option 604. The URL or RSS/Atom feed is then sent by the client device 110 to the server system. In one example, a publisher identifier (e.g., Org Id in operation 404 of FIG. 4) is also provided to the server system. For example, the computing device may also send a publisher identifier along with the URL or RSS/Atom to the server system. In another example, the server system determines the publisher identifier based on the URL, RSS/Atom feed, or other data (e.g., user data, login information, etc.) provided via the publisher interface 202.

Returning to FIG. 9, in operation 904, the server system determines a set of selectors associated with the publisher identifier, as explained above with respect to operation 304 of FIG. 3 and operations 406 and 408 of FIG. 4.

The server system next processes each of the location data in the list of location data. Thus, for each location data in the list of location data, the server system performs operations 906-912.

In operation 906, the server system accesses the source data using the location data. For example, the server system accesses the source data using a URL listed in the RSS or Atom feed to access the webpage associated with the URL.

In operation 908, the server system extracts specified content for each selector from the source data, as explained above for operation 308 of FIG. 3 and operation 410 of FIG. 4.

In operation 910, the server system populates a template using the specified content of the selectors, as described above for operation 310 of FIG. 3, 412-424 of FIG. 4, and FIG. 7. In operation 912, the server system generates a media content item from the populated template, as described above for operation 312 of FIG. 3. In operation 914, the server system checks to see whether there is any further location data in the list of location data that has not yet been processed. If there is more location data (yes), the server system returns to operation 906. If there is no more location data (no), the server system finishes processing the source data at operation 916.

In one example, the server system generates a media collection comprising the media content items that were generated from the plurality of source data (based on the list of location data for the plurality of source data). The media content items and/or the media collection can be stored in one or more databases 120 and/or 210. The server system can then publish the generated media collection comprising the generated media content items to a content sharing platform, as described above for publishing a media content item.

In another example, the server system can cause the display of the generated media collection comprising the generated media content items on a computing device. As described above, in one example, the saved media content item or media collection is provided to the automatic media content creation service 206, as shown in operation 428 of FIG. 4, which provides the media content item to the publisher interface 202, as shown in operation 430. In this way the server system causes the media content item to be displayed on a client device 110. This is also shown and described above with respect to FIG. 8. In this way a user can edit one or more of the media content items in the media collection, delete one or more of the media content items from the media collections, add one or more new media content items, add different media content items using the publisher media library, use one or more different templates for a media content item, and so forth.

As explained above, once any edits have been made to one or more media content items in the media collection, the computing device (e.g., client device 110) sends the final media content items of the media collection to the server system. The server system saves the final media content items. For example, the server system receives updated content for at least one region of at least one generated media content item from the computing device and stores the updated content. In another example, no updates are made to the media content items and the generated media content items are stored as they were generated by the server system. In yet another example, the media content items are not displayed on a client device but instead are automatically published as a media collection to a content sharing platform once the media collection is generated.

In one example, a second template can be selected to generate a second media content item or to replace a generated media content item using a first template. The server system may determine the second template (e.g., receive a selection of a second template), populate each region of the second template using specified content for the selector associated with each region of the template, as described above. The server system can use updated content for the at least one region to populate the at least one region of the second template. The server system can generate a second media content item from the populated second template and cause display of the generated second media content item on the computing device, as explained above. In this way, changes made to one template can be used to populate a second template so that a user does not need to make the change again, as explained above.

The server system can publish the generated media collection to a content sharing platform, as explained above.

Some example embodiments allow for scheduling when new media collections should be generated by specifying a time interval (e.g., between one and ten days) and a time interval (e.g., midnight in the publisher's time zone) for generating new media collections. For example, a user (e.g., associated with a publisher identifier) could schedule, via a publisher interface 202 on his client device 110, how often he would like new media collections generated based on a specified RSS or Atom feed. For example, a publisher may typically update an RSS or Atom feed once a day. The publisher can specify that a new media collection be created once a day and optionally the time of day (e.g., the default could be midnight the publisher's time zone). The client device 110 would send the scheduling information to the server system and the server system would store the information. The new media collection would be triggered according to the scheduling information. Once it is triggered, the server system accesses the RSS or Atom feed, determines if any content listed in the RSS or Atom feed has been previously processed (and thus, is part of a previous media collection), and then generates a new media collection based on the new source content in the RSS or Atom feed, as explained above. The new media collection can be automatically published or provided to a computing device for editing, as also described above.

In another example, the server system can periodically (e.g., hourly) parse the RSS or Atom feed content for any new content for generating a new media content item or a new media collection. If the server system determines there is new content in the RSS or Atom feed, the server system can generate one or more new media content items or a new media collection based on the new content in the RSS or Atom feed. The new media collection can be automatically published or provided to a computing device for editing, as also described above.

The media content items may be generated based on an automatically determined template or templates, a default template set by the server system, or a default template identifier supplied by the publisher.

Figure 10:
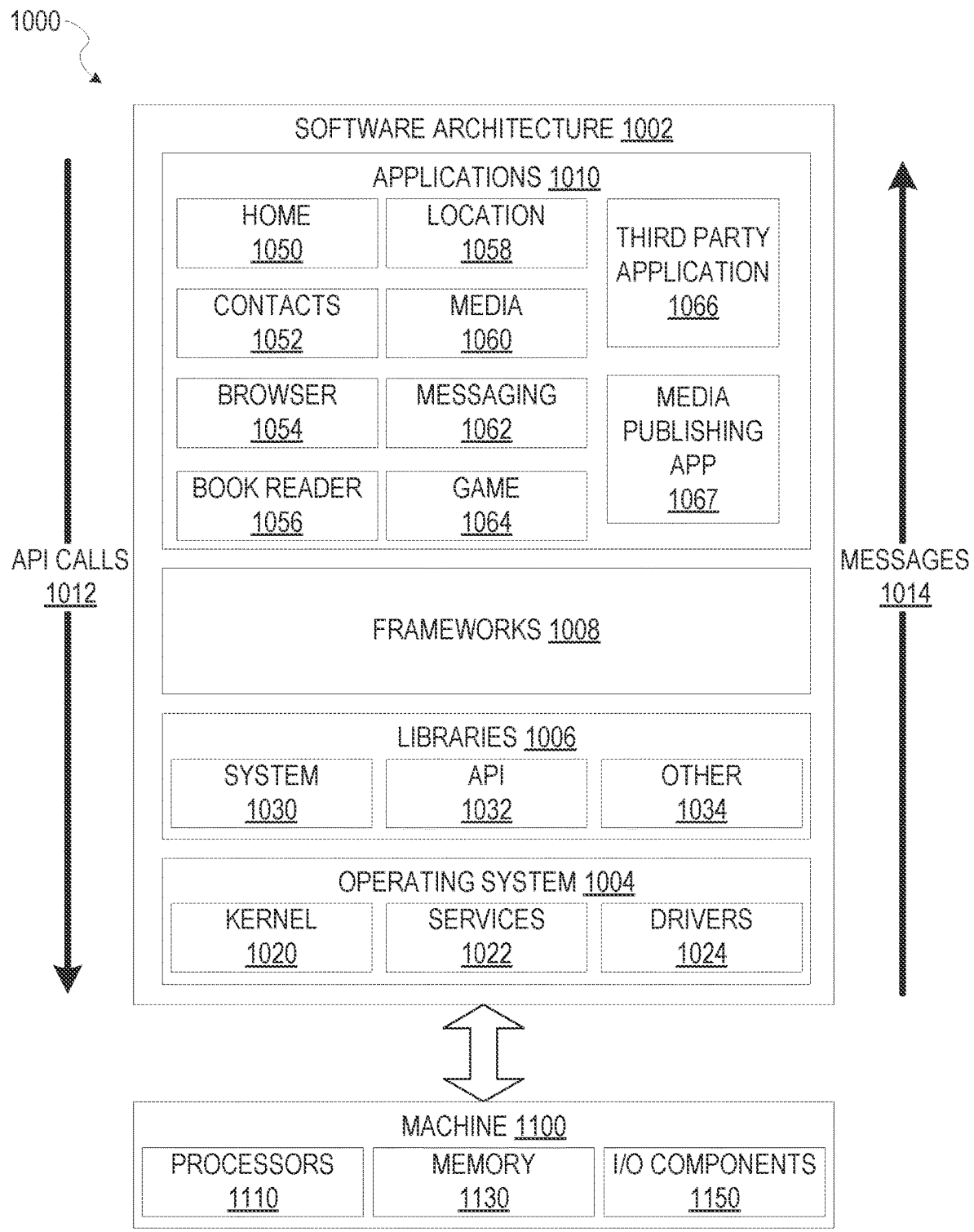
FIG. 10 is a block diagram illustrating an example of a software architecture that may be installed on a machine, according to some example embodiments.

FIG. 10 is a block diagram 1000 illustrating a software architecture 1002, which can be installed on any one or more of the devices described above. For example, in various embodiments, client devices 110, server systems 108, and servers 102, 112, 116, 118, 122, 124 and 128 may be implemented using some or all of the elements of the software architecture 1002. FIG. 10 is merely a non-limiting example of a software architecture, and it will be appreciated that many other architectures can be implemented to facilitate the functionality described herein. In various embodiments, the software architecture 1002 is implemented by hardware such as machine 1100 of FIG. 11 that includes processors 1110, memory 1130, and I/O components 1150. In this example, the software architecture 1002 can be conceptualized as a stack of layers where each layer may provide a particular functionality. For example, the software architecture 1002 includes layers such as an operating system 1004, libraries 1006, frameworks 1008, and applications 1010. Operationally, the applications 1010 invoke API calls 1012 through the software stack and receive messages 1014 in response to the API calls 1012, consistent with some embodiments.

In various implementations, the operating system 1004 manages hardware resources and provides common services. The operating system 1004 includes, for example, a kernel 1020, services 1022, and drivers 1024. The kernel 1020 acts as an abstraction layer between the hardware and the other software layers, consistent with some embodiments. For example, the kernel 1020 provides memory management, processor management (e.g., scheduling), component management, networking, and security settings, among other functionality. The services 1022 can provide other common services for the other software layers. The drivers 1024 are responsible for controlling or interfacing with the underlying hardware, according to some embodiments. For instance, the drivers 1024 can include display drivers, camera drivers, BLUETOOTH® or BLUETOOTH® Low Energy drivers, flash memory drivers, serial communication drivers (e.g., Universal Serial Bus (USB) drivers), WI-FI® drivers, audio drivers, power management drivers, and so forth.

In some embodiments, the libraries 1006 provide a low-level common infrastructure utilized by the applications 1010. The libraries 1006 can include system libraries 1030 (e.g., C standard library) that can provide functions such as memory allocation functions, string manipulation functions, mathematic functions, and the like. In addition, the libraries 1006 can include API libraries 1032 such as media libraries (e.g., libraries to support presentation and manipulation of various media formats such as Moving Picture Experts Group-4 (MPEG4), Advanced Video Coding (H.264 or AVC), Moving Picture Experts Group Layer-3 (MP3), Advanced Audio Coding (AAC), Adaptive Multi-Rate (AMR) audio codec, Joint Photographic Experts Group (JPEG or JPG), or Portable Network Graphics (PNG)), graphics libraries (e.g., an OpenGL framework used to render in two dimensions (2D) and in three dimensions (3D) graphic content on a display), database libraries (e.g., SQLite to provide various relational database functions), web libraries (e.g., WebKit to provide web browsing functionality), and the like. The libraries 1006 can also include a wide variety of other libraries 1034 to provide many other APIs to the applications 1010.

The frameworks 1008 provide a high-level common infrastructure that can be utilized by the applications 1010, according to some embodiments. For example, the frameworks 1008 provide various graphic user interface (GUI) functions, high-level resource management, high-level location services, and so forth. The frameworks 1008 can provide a broad spectrum of other APIs that can be utilized by the applications 1010, some of which may be specific to a particular operating system 1004 or platform.

In an example embodiment, the applications 1010 include a home application 1050, a contacts application 1052, a browser application 1054, a book reader application 1056, a location application 1058, a media application 1060, a messaging application 1062, a game application 1064, and a broad assortment of other applications such as a third-party application 1066. According to some embodiments, the applications 1010 are programs that execute functions defined in the programs. Various programming languages can be employed to create one or more of the applications 1010, structured in a variety of manners, such as object-oriented programming languages (e.g., Objective-C, Java, or C++) or procedural programming languages (e.g., C or assembly language). In a specific example, the third-party application 1066 (e.g., an application developed using the ANDROID™ or IOS™ software development kit (SDK) by an entity other than the vendor of the particular platform) may be mobile software running on a mobile operating system such as IOS™, ANDROID™, WINDOWS® Phone, or another mobile operating system. In this example, the third-party application 1066 can invoke the API calls 1012 provided by the operating system 1004 to facilitate functionality described herein.

Some embodiments may particularly include a media publishing application 1067. In certain embodiments, this may be a standalone application that operates to manage communications with a server system such as third-party servers or the server system 108. In other embodiments, this functionality may be integrated with another application (e.g., messaging application 1062). The media publishing application 1067 may request and display various data related to messaging, media content, media collections, media overlays, user profiles, publisher profiles, and so forth, and may provide the capability for a user to input data related to the system via a touch interface, via a keyboard, or using a camera device of the machine 1100, communication with a server system via I/O components 1150, and receipt and storage of object data in memory 1130. Presentation of information and user inputs associated with the information may be managed by the media content application 1067 using different frameworks 1008, library 1006 elements, or operating system 1004 elements operating on the machine 1100.

Figure 11:
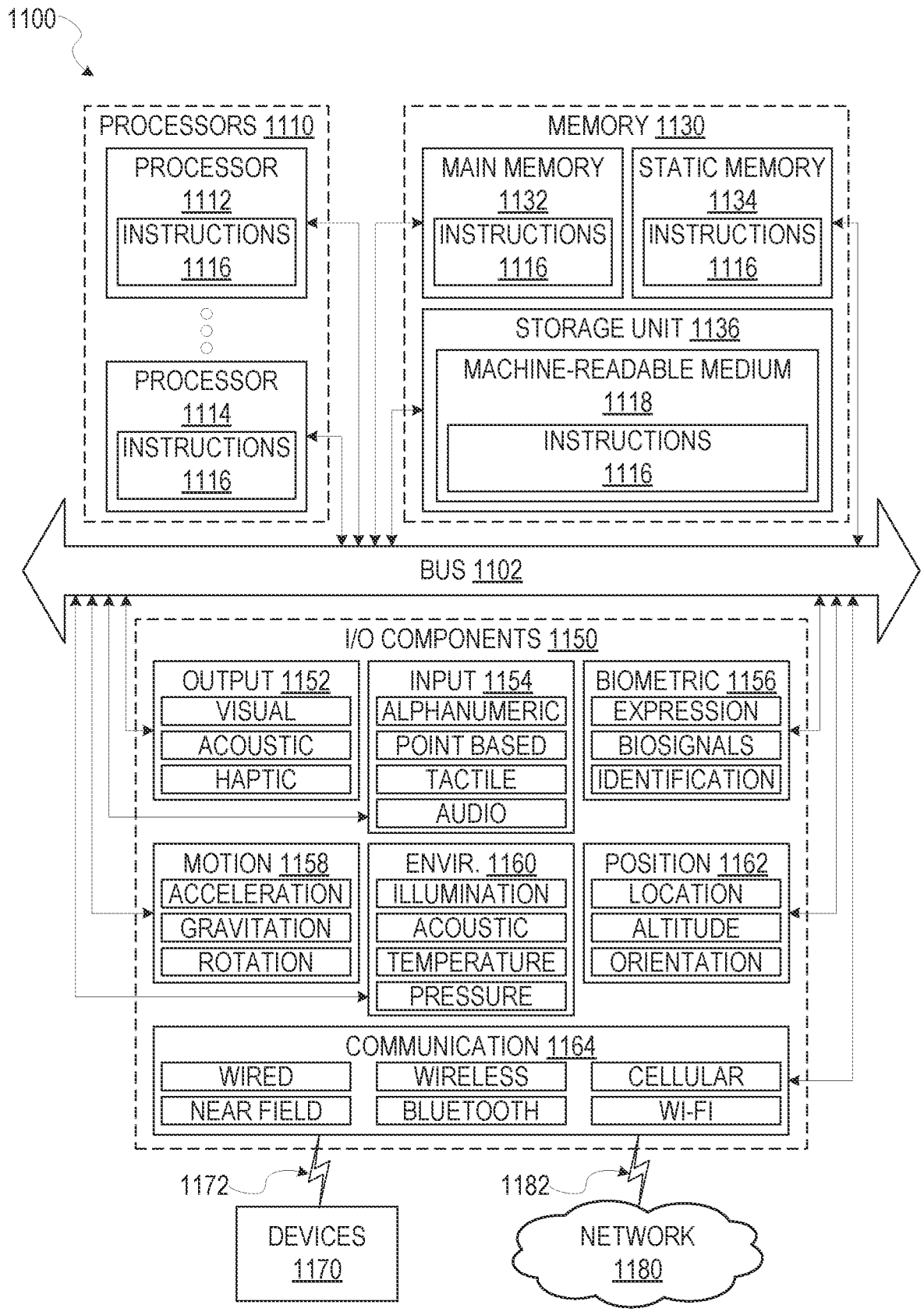
FIG. 11 illustrates a diagrammatic representation of a machine, in the form of a computer system, within which a set of instructions may be executed for causing the machine to perform any one or more of the methodologies discussed herein, according to an example embodiment.

FIG. 11 is a block diagram illustrating components of a machine 1100, according to some embodiments, able to read instructions from a machine-readable medium (e.g., a machine-readable storage medium) and perform any one or more of the methodologies discussed herein. Specifically, FIG. 11 shows a diagrammatic representation of the machine 1100 in the example form of a computer system, within which instructions 1116 (e.g., software, a program, an application, an applet, an app, or other executable code) for causing the machine 1100 to perform any one or more of the methodologies discussed herein can be executed. In alternative embodiments, the machine 1100 operates as a standalone device or can be coupled (e.g., networked) to other machines. In a networked deployment, the machine 1100 may operate in the capacity of a server machine or system 108, 112, 116, 118, 122, 124, 128 and the like, or a client device 110 in a server-client network environment, or as a peer machine in a peer-to-peer (or distributed) network environment. The machine 1100 can comprise, but not be limited to, a server computer, a client computer, a personal computer (PC), a tablet computer, a laptop computer, a netbook, a personal digital assistant (PDA), an entertainment media system, a cellular telephone, a smart phone, a mobile device, a wearable device (e.g., a smart watch), a smart home device (e.g., a smart appliance), other smart devices, a web appliance, a network router, a network switch, a network bridge, or any machine capable of executing the instructions 1116, sequentially or otherwise, that specify actions to be taken by the machine 1100. Further, while only a single machine 1100 is illustrated, the term "machine" shall also be taken to include a collection of machines 1100 that individually or jointly execute the instructions 1116 to perform any one or more of the methodologies discussed herein.

In various embodiments, the machine 1100 comprises processors 1110, memory 1130, and I/O components 1150, which can be configured to communicate with each other via a bus 1102. In an example embodiment, the processors 1110 (e.g., a central processing unit (CPU), a reduced instruction set computing (RISC) processor, a complex instruction set computing (CISC) processor, a graphics processing unit (GPU), a digital signal processor (DSP), an application specific integrated circuit (ASIC), a radio-frequency integrated circuit (RFIC), another processor, or any suitable combination thereof) include, for example, a processor 1112 and a processor 1114 that may execute the instructions 1116. The term "processor" is intended to include multi-core processors 1110 that may comprise two or more independent processors 1112, 1114 (also referred to as "cores") that can execute instructions 1116 contemporaneously. Although FIG. 11 shows multiple processors 1110, the machine 1100 may include a single processor 1110 with a single core, a single processor 1110 with multiple cores (e.g., a multi-core processor 1110), multiple processors 1112, 1114 with a single core, multiple processors 1112, 1114 with multiple cores, or any combination thereof.

The memory 1130 comprises a main memory 1132, a static memory 1134, and a storage unit 1136 accessible to the processors 1110 via the bus 1102, according to some embodiments. The storage unit 1136 can include a machine-readable medium 1118 on which are stored the instructions 1116 embodying any one or more of the methodologies or functions described herein. The instructions 1116 can also reside, completely or at least partially, within the main memory 1132, within the static memory 1134, within at least one of the processors 1110 (e.g., within the processor's cache memory), or any suitable combination thereof, during execution thereof by the machine 1100. Accordingly, in various embodiments, the main memory 1132, the static memory 1134, and the processors 1110 are considered machine-readable media 1118.

As used herein, the term "memory" refers to a machine-readable medium 1118 able to store data temporarily or permanently and may be taken to include, but not be limited to, random-access memory (RAM), read-only memory (ROM), buffer memory, flash memory, and cache memory. While the machine-readable medium 1118 is shown, in an example embodiment, to be a single medium, the term "machine-readable medium" should be taken to include a single medium or multiple media (e.g., a centralized or distributed database, or associated caches and servers) able to store the instructions 1116. The term "machine-readable medium" shall also be taken to include any medium, or combination of multiple media, that is capable of storing instructions (e.g., instructions 1116) for execution by a machine (e.g., machine 1100), such that the instructions 1116, when executed by one or more processors of the machine 1100 (e.g., processors 1110), cause the machine 1100 to perform any one or more of the methodologies described herein. Accordingly, a "machine-readable medium" refers to a single storage apparatus or device, as well as "cloud-based" storage systems or storage networks that include multiple storage apparatus or devices. The term "machine-readable medium" shall accordingly be taken to include, but not be limited to, one or more data repositories in the form of a solid-state memory (e.g., flash memory), an optical medium, a magnetic medium, other non-volatile memory (e.g., erasable programmable read-only memory (EPROM)), or any suitable combination thereof. The term "machine-readable medium" specifically excludes non-statutory signals per se.

The I/O components 1150 include a wide variety of components to receive input, provide output, produce output, transmit information, exchange information, capture measurements, and so on. In general, it will be appreciated that the I/O components 1150 can include many other components that are not shown in FIG. 11. The I/O components 1150 are grouped according to functionality merely for simplifying the following discussion, and the grouping is in no way limiting. In various example embodiments, the I/O components 1150 include output components 1152 and input components 1154. The output components 1152 include visual components (e.g., a display such as a plasma display panel (PDP), a light emitting diode (LED) display, a liquid crystal display (LCD), a projector, or a cathode ray tube (CRT)), acoustic components (e.g., speakers), haptic components (e.g., a vibratory motor), other signal generators, and so forth. The input components 1154 include alphanumeric input components (e.g., a keyboard, a touch screen configured to receive alphanumeric input, a photo-optical keyboard, or other alphanumeric input components), point-based input components (e.g., a mouse, a touchpad, a trackball, a joystick, a motion sensor, or other pointing instruments), tactile input components (e.g., a physical button, a touch screen that provides location and force of touches or touch gestures, or other tactile input components), audio input components (e.g., a microphone), and the like.

In some further example embodiments, the I/O components 1150 include biometric components 1156, motion components 1158, environmental components 1160, or position components 1162, among a wide array of other components. For example, the biometric components 1156 include components to detect expressions (e.g., hand expressions, facial expressions, vocal expressions, body gestures, or eye tracking), measure biosignals (e.g., blood pressure, heart rate, body temperature, perspiration, or brain waves), identify a person (e.g., voice identification, retinal identification, facial identification, fingerprint identification, or electroencephalogram based identification), and the like. The motion components 1158 include acceleration sensor components (e.g., accelerometer), gravitation sensor components, rotation sensor components (e.g., gyroscope), and so forth. The environmental components 1160 include, for example, illumination sensor components (e.g., photometer), temperature sensor components (e.g., one or more thermometers that detect ambient temperature), humidity sensor components, pressure sensor components (e.g., barometer), acoustic sensor components (e.g., one or more microphones that detect background noise), proximity sensor components (e.g., infrared sensors that detect nearby objects), gas sensor components (e.g., machine olfaction detection sensors, gas detection sensors to detect concentrations of hazardous gases for safety or to measure pollutants in the atmosphere), or other components that may provide indications, measurements, or signals corresponding to a surrounding physical environment. The position components 1162 include location sensor components (e.g., a Global Positioning System (GPS) receiver component), altitude sensor components (e.g., altimeters or barometers that detect air pressure from which altitude may be derived), orientation sensor components (e.g., magnetometers), and the like.

Communication can be implemented using a wide variety of technologies. The I/O components 1150 may include communication components 1164 operable to couple the machine 1100 to a network 1180 or devices 1170 via a coupling 1182 and a coupling 1172, respectively. For example, the communication components 1164 include a network interface component or another suitable device to interface with the network 1180. In further examples, communication components 1164 include wired communication components, wireless communication components, cellular communication components, near field communication (NFC) components, BLUETOOTH® components (e.g., BLUETOOTH® Low Energy), WI-FI® components, and other communication components to provide communication via other modalities. The devices 1170 may be another machine 1100 or any of a wide variety of peripheral devices (e.g., a peripheral device coupled via a Universal Serial Bus (USB)).

Moreover, in some embodiments, the communication components 1164 detect identifiers or include components operable to detect identifiers. For example, the communication components 1164 include radio frequency identification (RFID) tag reader components, NFC smart tag detection components, optical reader components (e.g., an optical sensor to detect a one-dimensional bar codes such as a Universal Product Code (UPC) bar code, multi-dimensional bar codes such as a Quick Response (QR) code, Aztec Code, Data Matrix, Dataglyph, MaxiCode, PDF417, Ultra Code, Uniform Commercial Code Reduced Space Symbology (UCC RSS)-2D bar codes, and other optical codes), acoustic detection components (e.g., microphones to identify tagged audio signals), or any suitable combination thereof. In addition, a variety of information can be derived via the communication components 1164, such as location via Internet Protocol (IP) geolocation, location via WI-FI® signal triangulation, location via detecting a BLUETOOTH® or NFC beacon signal that may indicate a particular location, and so forth.

In various example embodiments, one or more portions of the network 1180 can be an ad hoc network, an intranet, an extranet, a virtual private network (VPN), a local area network (LAN), a wireless LAN (WLAN), a wide area network (WAN), a wireless WAN (WWAN), a metropolitan area network (MAN), the Internet, a portion of the Internet, a portion of the public switched telephone network (PSTN), a plain old telephone service (POTS) network, a cellular telephone network, a wireless network, a WI-FI® network, another type of network, or a combination of two or more such networks. For example, the network 1180 or a portion of the network 1180 may include a wireless or cellular network, and the coupling 1182 may be a Code Division Multiple Access (CDMA) connection, a Global System for Mobile communications (GSM) connection, or another type of cellular or wireless coupling. In this example, the coupling 1182 can implement any of a variety of types of data transfer technology, such as Single Carrier Radio Transmission Technology (1×RTT), Evolution-Data Optimized (EVDO) technology, General Packet Radio Service (GPRS) technology, Enhanced Data rates for GSM Evolution (EDGE) technology, third Generation Partnership Project (3GPP) including 3G, fourth generation wireless (4G) networks, Universal Mobile Telecommunications System (UMTS), High Speed Packet Access (HSPA), Worldwide Interoperability for Microwave Access (WiMAX), Long Term Evolution (LTE) standard, others defined by various standard-setting organizations, other long range protocols, or other data transfer technology.

In example embodiments, the instructions 1116 are transmitted or received over the network 1180 using a transmission medium via a network interface device (e.g., a network interface component included in the communication components 1164) and utilizing any one of a number of well-known transfer protocols (e.g., Hypertext Transfer Protocol (HTTP)). Similarly, in other example embodiments, the instructions 1116 are transmitted or received using a transmission medium via the coupling 1172 (e.g., a peer-to-peer coupling) to the devices 1170. The term "transmission medium" shall be taken to include any intangible medium that is capable of storing, encoding, or carrying the instructions 1116 for execution by the machine 1100, and includes digital or analog communications signals or other intangible media to facilitate communication of such software.

Furthermore, the machine-readable medium 1118 is non-transitory (in other words, not having any transitory signals) in that it does not embody a propagating signal. However, labeling the machine-readable medium 1118 "non-transitory" should not be construed to mean that the medium is incapable of movement; the machine-readable medium 1118 should be considered as being transportable from one physical location to another. Additionally, since the machine-readable medium 1118 is tangible, the machine-readable medium 1118 may be considered to be a machine-readable device.

Throughout this specification, plural instances may implement components, operations, or structures described as a single instance. Although individual operations of one or more methods are illustrated and described as separate operations, one or more of the individual operations may be performed concurrently, and nothing requires that the operations be performed in the order illustrated. Structures and functionality presented as separate components in example configurations may be implemented as a combined structure or component. Similarly, structures and functionality presented as a single component may be implemented as separate components. These and other variations, modifications, additions, and improvements fall within the scope of the subject matter herein.

Although an overview of the inventive subject matter has been described with reference to specific example embodiments, various modifications and changes may be made to these embodiments without departing from the broader scope of embodiments of the present disclosure.

The embodiments illustrated herein are described in sufficient detail to enable those skilled in the art to practice the teachings disclosed. Other embodiments may be used and derived therefrom, such that structural and logical substitutions and changes may be made without departing from the scope of this disclosure. The Detailed Description, therefore, is not to be taken in a limiting sense, and the scope of various embodiments is defined only by the appended claims, along with the full range of equivalents to which such claims are entitled.

As used herein, the term "or" may be construed in either an inclusive or exclusive sense. Moreover, plural instances may be provided for resources, operations, or structures described herein as a single instance. Additionally, boundaries between various resources, operations, modules, engines, and data stores are somewhat arbitrary, and particular operations are illustrated in a context of specific illustrative configurations. Other allocations of functionality are envisioned and may fall within a scope of various embodiments of the present disclosure. In general, structures and functionality presented as separate resources in the example configurations may be implemented as a combined structure or resource. Similarly, structures and functionality presented as a single resource may be implemented as separate resources. These and other variations, modifications, additions, and improvements fall within a scope of embodiments of the present disclosure as represented by the appended claims. The specification and drawings are, accordingly, to be regarded in an illustrative rather than a restrictive sense.

What is claimed is:

1. A method comprising:
   determining, by the server system, a set of selectors, of a plurality of selectors, that are associated with a publisher identifier, each selector comprising specified content to extract from source data and one or more rules for extracting the specified content from the source data;
   extracting, by the server system, from the source data, specified content for each selector of a subset of the set of selectors based on the one or more rules specified in each selector of the subset of the set of selectors;
   determining, by the server system, a first template comprising regions corresponding to each selector of the subset of the set of selectors that are associated with the publisher identifier;
   populating, by the server system, each region of the first template using specified content for the corresponding selector; and
   generating, by the server system, the media content item from the populated first template.

2. The method of claim 1, further comprising:
accessing the source data using received location information associated with the publisher identifier, wherein the location information is a Uniform Resource Locator (URL) and the source data is associated with a web page.

3. The method of claim 2, wherein extracting specified content comprises parsing the web page to determine the specified content using the one or more rules specified in the selector.

4. The method of claim 1, wherein determining the first template to use to generate the media content item is based on receiving a selection of the first template from the plurality of templates.

5. The method of claim 1, wherein determining the first template to use to generate the media content item comprises determining that the first template comprises selectors corresponding to specified content in the subset of the set of selectors.

6. The method of claim 1, further comprising:
receiving updated content for at least one region of the generated media content item;
storing the updated content for the at least one region of the generated media content item;
receiving a selection of a second template to use to generate a second media content item, the second template comprising regions corresponding to the one or more selectors;
populating each region of the second template using specified content for the corresponding selector and the updated content for the at least one region of the generated media content item; and
generating a second media content item from the populated second template.

7. The method of claim 1, further comprising publishing the generated media content item to a content sharing platform.

8. A system comprising:
a memory that stores instructions; and
one or more processors configured by the instructions to perform operations comprising:
determining a set of selectors, of a plurality of selectors, that are associated with a publisher identifier, each selector comprising specified content to extract from source data and one or more ml es for extracting the specified content from the source data;
extracting from the source data, specified content for each selector of a subset of the set of selectors based on the one or more rules specified in each selector of the subset of the set of selectors;
determining a first template comprising regions corresponding to each selector of the subset of the set of selectors that are associated with the publisher identifier;
populating each region of the first template using specified content for the corresponding selector; and
generating the media content item from the populated first template.

9. The system of claim 8, the operations further comprising:
accessing the source data using received location information associated with the publisher identifier, wherein the location information is a Uniform Resource Locator (URL) and the source data is associated with a web page.

10. The system of claim 9, wherein extracting specified content comprises parsing the web page to determine the specified content using the one or more rules specified in the selector.

11. The system of claim 8, wherein determining the first template to use to generate the media content item is based on receiving a selection of the first template from the plurality of templates.

12. The system of claim 8, wherein determining the first template to use to generate the media content item comprises determining that the first template comprises selectors corresponding to specified content in the subset of the set of selectors.

13. The system of claim 8, the operations further comprising:
receiving updated content for at least one region of the generated media content item;
storing the updated content for the at least one region of the generated media content item;
receiving a selection of a second template to use to generate a second media content item, the second template comprising regions corresponding to the one or more selectors;
populating each region of the second template using specified content for the corresponding selector and the updated content for the at least one region of the generated media content item; and
generating a second media content item from the populated second template.

14. The system of claim 8, the operations further comprising publishing the generated media content item to a content sharing platform.

15. A non-transitory computer-readable medium comprising instructions stored thereon that are executable by at least one processor to cause a computing device to perform operations comprising:
determining a set of selectors, of a plurality of selectors, that are associated with a publisher identifier, each selector comprising specified content to extract from source data and one or more rules for extracting the specified content from the source data;
extracting from the source data, specified content for each selector of a subset of the set of selectors based on the one or more rules specified in each selector of the subset of the set of selectors;
determining a first template comprising regions corresponding to each selector of the subset of the set of selectors that are associated with the publisher identifier;
populating each region of the first template using specified content for the corresponding selector; and
generating the media content item from the populated first template.

16. The non-transitory computer-readable medium of claim 15, the operations further comprising:
accessing the source data using received location information associated with the publisher identifier, wherein the location information is a Uniform Resource Locator (URL) and the source data is associated with a web page and wherein extracting specified content comprises parsing the web page to determine the specified content using the one or more rules specified in the selector.

17. The non-transitory computer-readable medium of claim 15, wherein determining the first template to use to generate a media content item is based on receiving a selection of the first template from the plurality of templates.

18. The non-transitory computer-readable medium of claim 15, wherein determining the first template to use to generate a media content item comprises determining that the first template comprises selectors corresponding to specified content in the subset of the set of selectors.

19. The non-transitory computer-readable medium of claim 15, the operations further comprising:
receiving updated content for at least one region of the generated media content item;
storing the updated content for the at least one region of the generated media content item;
receiving a selection of a second template to use to generate a second media content item, the second template comprising regions corresponding to the one or more selectors;
populating each region of the second template using specified content for the corresponding selector and the updated content for the at least one region of the generated media content item; and
generating a second media content item from the populated second template.

20. The non-transitory computer-readable medium of claim 15, the operations further comprising publishing the generated media content item to a content sharing platform.

* * * * *